(12) United States Patent
Shono et al.

(10) Patent No.: US 8,825,339 B2
(45) Date of Patent: Sep. 2, 2014

(54) VEHICULAR DRIVE CONTROL APPARATUS

(75) Inventors: Shoichi Shono, Miyoshi (JP);
Yoshikazu Motozono, Miyoshi (JP);
Masafumi Uchihara, Toyota (JP);
Akihiro Ueda, Nagoya (JP); JongGap Kim, Susono (JP); Norimi Asahara, Numazu (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/820,299

(22) PCT Filed: Sep. 3, 2010

(86) PCT No.: PCT/JP2010/065163
§ 371 (c)(1),
(2), (4) Date: Apr. 17, 2013

(87) PCT Pub. No.: WO2012/029178
PCT Pub. Date: Mar. 8, 2012

(65) Prior Publication Data
US 2013/0211686 A1    Aug. 15, 2013

(51) Int. Cl.
*G06F 7/00*     (2006.01)
*G06F 17/00*    (2006.01)
*B60L 11/00*    (2006.01)

(52) U.S. Cl.
USPC .................... 701/93; 701/22; 701/70; 701/96

(58) Field of Classification Search
CPC ... B60W 10/06; B60W 30/16; B60W 30/143; B60W 20/00; B60W 40/09; B60W 40/10; B60W 40/105; B60W 2540/10; B60W 2540/106; B60W 2550/308; B60W 2750/308; B60T 2201/02; B60T 2220/02
USPC ................................................. 701/70, 93, 96
See application file for complete search history.

(56) References Cited

U.S. PATENT DOCUMENTS

| | | | |
|---|---|---|---|
| 2011/0210838 A1* | 9/2011 | Fujiki et al. | 340/439 |
| 2013/0103238 A1* | 4/2013 | Yu et al. | 701/22 |
| 2013/0226420 A1* | 8/2013 | Pedlar et al. | 701/67 |

FOREIGN PATENT DOCUMENTS

| | | |
|---|---|---|
| JP | 2007-187090 A | 7/2007 |
| JP | 2008-105639 A | 5/2008 |
| JP | 2010-132241 A | 6/2010 |

* cited by examiner

*Primary Examiner* — Khoi Tran
*Assistant Examiner* — Robert Nguyen
(74) *Attorney, Agent, or Firm* — Sughrue Mion, PLLC

(57) ABSTRACT

A vehicular drive control apparatus provided with pulse-driving and gliding means for setting upper limit Vhi and lower limit Vlo of running speed V of a vehicle according to an upper and lower vehicle speed limit maps, and on the basis of target running speed Vt which is the running speed V at a time when control initiating conditions have been satisfied, and running the vehicle in P & G running mode by alternately repeating pulse-driving run (accelerating run) and gliding run (decelerating run) of the vehicle at the running speed V varying between the set upper and lower limits Vhi and Vlo, the control initiating conditions including a condition that the vehicle is in a steady running state.

6 Claims, 12 Drawing Sheets

FIG. 7
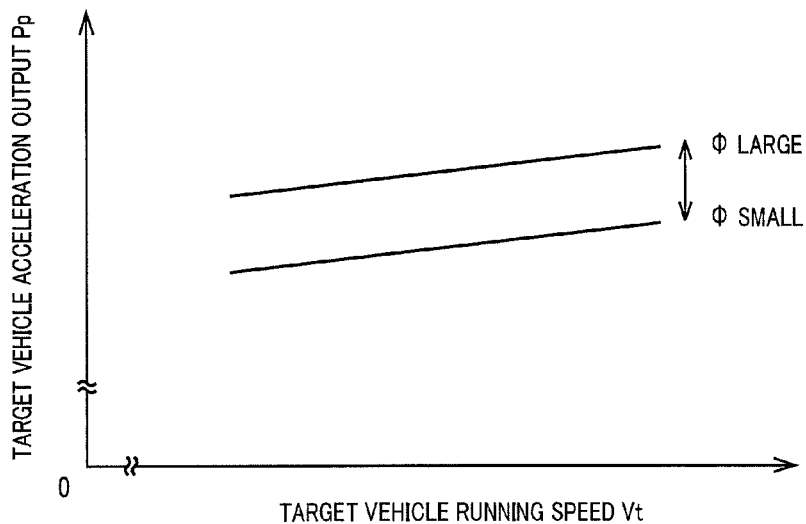
FIG. 8 (a)
OPERATING STATES IN P & G RUNNING MODE
|  | ENGINE | MG1 | MG2 |
|---|---|---|---|
| PULSE-DRIVING RUN | OPERATED STATE | REGENERATIVE STATE | VEHICLE DRIVING/ FREE STATE |
| GLIDING RUN | NON-OPERATED STATE | FREE STATE | FREE STATE |
FIG. 8 (b)
VEHICLE RUNNING SPEED TIME CHART
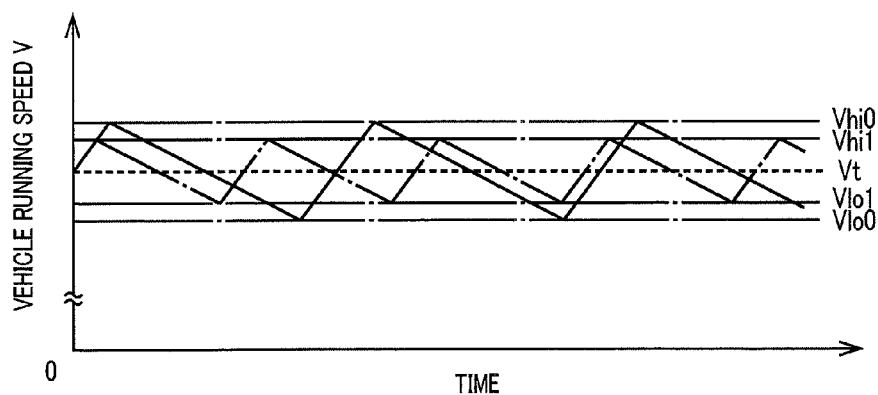

ENGINE-DRVEN VEHICLE

OPERATING STATES IN P & G RUNNING MODE

|  | ENGINE | AUTOMATIC TRANSMISSION |
|---|---|---|
| PULSE-DRIVING RUN | OPERATED STATE | DRIVING STATE |
| GLIDING RUN | IDLING STATE | NEUTRAL STATE |

ELECTRIC VEHICLE

OPERATING STATES IN P & G RUNNING MODE

|  | MG | CONNECTING/ DISCONNECTING DEVICE |
|---|---|---|
| PULSE-DRIVING RUN | VEHICLE DRIVING STATE | POWER TRANSMITTING STATE |
| GLIDING RUN | FREE STATE | POWER CUT-OFF STATE |

VEHICULAR DRIVE CONTROL APPARATUS

TECHNICAL FIELD

The present invention relates to a vehicular drive control apparatus, and more particularly to improvements of a drive control apparatus having accelerating/decelerating means for running a vehicle in an alternately accelerating and decelerating mode by alternately repeating an accelerating run and a decelerating run of the vehicle at the running speed varying between predetermined upper and lower limits.

BACKGROUND ART

There is proposed a vehicle having accelerating/decelerating means for running the vehicle in an alternately accelerating and decelerating mode by alternately repeating an accelerating run and a decelerating run of the vehicle at a running speed varying between upper and lower limits which are set on the basis of a predetermined target running speed of the vehicle. Patent Document 1 discloses an example of such a vehicle, which is run in the alternately accelerating and decelerating mode described above so as to improve the fuel economy of the vehicle, in an automatic cruising control mode in which a vehicle drive power source is automatically controlled to run the vehicle at the target running speed set by an operator of the vehicle. Namely, where the vehicle is run in the automatic cruising control mode at relatively low running speeds at which an engine is required to be operated in an operating region of a comparatively low operating efficiency, the vehicle is run in the alternately accelerating and decelerating mode described above such that the accelerating run is performed with the engine operated in an operating region of a high operating efficiency, while the decelerating run is performed in a gliding mode with a small running resistance with the engine held at rest, so that the overall fuel economy of the vehicle can be improved.

PRIOR ART DOCUMENT

Patent Document

Patent Document 1: JP-A-2007-187090

SUMMARY OF THE INVENTION

Object Achieved by the Invention

However, the vehicle running in the above-described conventional alternately accelerating and decelerating mode is performed in the automatic cruising control mode, and cannot enjoy an advantage of improved fuel economy of the vehicle where the vehicle is not configured to be run in the automatic cruising control mode, or when the automatic cruising control mode available for the vehicle is not established.

In view of the drawback described above, it is considered to set the upper and lower limits of the vehicle running speed on the basis of the running speed when control initiating conditions are satisfied, and to run the vehicle in the alternately accelerating and decelerating mode described above, independently of the automatic cruising control, to improve the fuel economy. The control initiating conditions include a condition that the vehicle is in a steady running state in which the amount of variation of an operation amount of an accelerator pedal is held within a predetermined range while the amount of variation of the running speed of the vehicle is held within a predetermined range. This control to accelerate and decelerate the vehicle, which is not publicly known, requires raising and lowering the vehicle running speed, so as not to make the vehicle operator feel uneasy about a variation of the vehicle running speed, in other words, so as to prevent the vehicle operator from recognizing the variation, and therefore requires adequate setting of the amount and rate of variation of the vehicle running speed during the alternately accelerating and decelerating runs of the vehicle (acceleration value during the accelerating run, and deceleration value during the decelerating run). However, the individual vehicle operators have different sensitivities with respect to the amount and rate of variation of the vehicle running speed, so that the different sensitivities make it difficult to adequately set the amount and rate of variation of the vehicle running speed. Namely, a relatively small amount of variation of the vehicle running speed reduces a possibility of the vehicle operator recognizing the variation of the vehicle running speed, but requires frequent change of the operating state of the vehicle drive power source such as the engine, giving rise to a failure to improve the fuel economy of the vehicle. A relatively low rate of variation of the vehicle running speed also reduces the possibility of the vehicle operator recognizing the variation of the vehicle running speed, but limits the operating region of the vehicle drive power source such as the engine during the accelerating run of the vehicle, giving rise to a risk of failure to operate the vehicle drive power source with a high degree of operating efficiency.

Where the vehicle is run in the alternately accelerating and decelerating mode while the vehicle in question is close to the preceding vehicle, there is a possibility that the vehicle operator performs a depressing operation of a brake pedal or other vehicle decelerating operation when the vehicle comes excessively close to the preceding vehicle during the accelerating run, and then immediately performs a vehicle accelerating operation, resulting in deterioration of the fuel economy of the vehicle. In this respect, the vehicle running in the alternately accelerating and decelerating mode should be initiated under the condition that the distance between the vehicle in question and the preceding vehicle is larger than a predetermined threshold value. However, the individual operators have different characteristics regarding the timings at which they release the accelerator pedal and depress the brake pedal, so that it is difficult to adequately set the lower limit of the vehicle-to-vehicle distance. If the threshold value of the vehicle-to-vehicle distance is set to be relatively large, the vehicle can be run in the alternately accelerating and decelerating mode while effectively avoiding the vehicle decelerating operation of the vehicle operator as a result of excessive approaching of the vehicle in question to the preceding vehicle during the accelerating run, but the frequency to run the vehicle in the alternately accelerating and decelerating mode decreases with an increase of the upper limit of the vehicle-to-vehicle distance, making it difficult to improve the fuel economy.

The present invention was made in view of the background art described above. It is therefore an object of the present invention to permit the vehicle to be run in the alternately accelerating and decelerating mode for effectively improving its fuel economy, independently of the automatic cruising control, and in an adequate manner irrespectively of different characteristics of the individual vehicle operators.

Means for Achieving the Object

The object indicated above is achieved according to a first aspect of the present invention, which provides a vehicular drive control apparatus, characterized by comprising (a)

alternately accelerating and decelerating means for setting upper and lower limits of a running speed of the vehicle on the basis of the running speed at a time when control initiating conditions have been satisfied, and running the vehicle in an alternately accelerating and decelerating mode by alternately repeating an accelerating run and a decelerating run of the vehicle at the running speed varying between the set upper and lower limits, the control initiating conditions including a condition that the vehicle is in a steady running state in which an amount of variation of an operation amount of an accelerator pedal is held within a predetermined range while an amount of variation of the running speed of the vehicle is held within a predetermined range, and (b) learning means for reducing the range of variation of the running speed or a rate of variation of the running speed during a subsequent running of the vehicle in the alternately accelerating and decelerating mode, when the amount of variation of the operation amount of said accelerator pedal during a present running of the vehicle under the control of the alternately accelerating and decelerating means has become equal to or larger than a predetermined upper limit.

The object is also achieved according to a second aspect of the invention, which provides a vehicular drive control apparatus, characterized by comprising (a) a vehicle-to-vehicle distance sensor for detecting a vehicle-to-vehicle distance between the vehicle and a preceding vehicle, (b) alternately accelerating and decelerating means for setting upper and lower limits of a running speed of the vehicle on the basis of the running speed at a time when control initiating conditions have been satisfied, and running the vehicle in an alternately accelerating and decelerating mode by alternately repeating an accelerating run and a decelerating run of the vehicle at the running speed varying between the set upper and lower limits, the control initiating conditions including a condition that the vehicle is in a steady running state in which an amount of variation of an operation amount of an accelerator pedal is held within a predetermined range while an amount of variation of the running speed of the vehicle is held within a predetermined range, and a condition that the above-described vehicle-to-vehicle distance is equal to or larger than a predetermined threshold value, and (c) learning means for compensating the above-described threshold value of the vehicle-to-vehicle distance, on the basis of the vehicle-to-vehicle distance detected by the above-described vehicle-to-vehicle distance sensor, when an operator of the vehicle has performed an operation to decelerate the vehicle in the above-described steady running state, so that the compensated threshold value is reflected on the above-described control initiating conditions for initiating a subsequent running of the vehicle in the alternately accelerating and decelerating mode.

According to a third aspect of the invention, the vehicular drive control apparatus according to the second aspect of the invention is configured such that the above-described learning means compensates the above-described threshold value of the vehicle-to-vehicle distance on the basis of the vehicle-to-vehicle distance detected by the above-described vehicle-to-vehicle distance sensor, when an amount of decrease of the operation amount of the above-described accelerator pedal has become equal to or larger than a predetermined upper limit during the running of the vehicle in the alternately accelerating and decelerating mode under the control of the above-described alternately accelerating and decelerating means.

According to a fourth aspect of the invention, the vehicular drive control apparatus according to the second or third aspect of the invention is configured such that the above-described threshold value of the vehicle-to-vehicle distance is set according to a running environment of the vehicle.

According to a fifth aspect of the invention, the vehicular drive control apparatus according to any one of the first through fourth aspects of the invention is configured such that the above-described control initiating conditions include a condition that it is possible to forecast, on the basis of past running data of the vehicle stored in a memory device in relation to map data, that the steady running state in which the amount of variation of the operation amount of the accelerator pedal is held within the predetermined range while the amount of variation of the running speed of the vehicle is held within the predetermined range will continue over a predetermined running distance or more of the vehicle.

Advantages of the Invention

The vehicular drive control apparatus according to the first aspect of the present invention is provided with the alternately accelerating and decelerating means for setting the upper and lower limits of the running speed of the vehicle on the basis of the running speed at the time when the control initiating conditions have been satisfied, and running the vehicle in the alternately accelerating and decelerating mode by alternately repeating the accelerating run and the decelerating run of the vehicle at the running speed varying between the set upper and lower limits, the control initiating conditions including the condition that the vehicle is in the steady running state in which the amount of variation of the operation amount of the accelerator pedal is held within the predetermined range while the amount of variation of the running speed of the vehicle is held within the predetermined range. Thus, the vehicle can be run in the alternately accelerating and decelerating mode, independently of the automatic cruising control, making it possible to improve the fuel economy.

The vehicular drive control apparatus is further provided with the learning means for reducing the range of variation of the running speed or the rate of variation of the running speed during the subsequent running of the vehicle in the alternately accelerating and decelerating mode, when the amount of variation of the operation amount of the accelerator pedal during the present running of the vehicle in the alternately accelerating and decelerating mode under the control of the alternately accelerating and decelerating means has become equal to or larger than the predetermined upper limit. Thus, the vehicle can be run in the alternately accelerating and decelerating mode at the running speed varying within a range specific to the vehicle operator, which is as broad as possible to the extent that the vehicle operator does not recognize a rise and a drop of the running speed in the alternately accelerating and decelerating mode, irrespective of a difference of the characteristics of the individual vehicle operators regarding the range or rate of variation of the running speed, so that the fuel economy can be effectively improved.

The vehicular drive control apparatus according to the second aspect of the invention is provided with the alternately accelerating and decelerating means for setting the upper and lower limits of the running speed of the vehicle on the basis of the running speed at the time when the control initiating conditions have been satisfied, and running the vehicle in the alternately accelerating and decelerating mode by alternately repeating the accelerating run and the decelerating run of the vehicle at the running speed varying between the set upper and lower limits, the control initiating conditions including the condition that the vehicle is in the steady running state in which the amount of variation of the operation amount of the accelerator pedal is held within the predetermined range while the amount of variation of the running speed of the vehicle is held within the predetermined range, and the condition that the above-described vehicle-to-vehicle distance is equal to or larger than the predetermined threshold value. Thus, the vehicle can be run in the alternately accelerating and decelerating mode, independently of the automatic cruising control, then the fuel economy can be improved.

Further, the threshold value of the vehicle-to-vehicle distance used as one of the control initiating conditions is compensated on the basis of the vehicle-to-vehicle distance detected by the vehicle-to-vehicle distance sensor, when the operator of the vehicle has performed an operation to decelerate the vehicle in the steady running state, so that the compensated threshold value is reflected on the control initiating conditions for initiating the subsequent running of the vehicle in the alternately accelerating and decelerating mode. Thus, the threshold value of the vehicle-to-vehicle distance can be minimized to the extent that makes it possible to avoid an operation of the vehicle operator to decelerate the vehicle when the vehicle comes excessively close to the preceding vehicle in the alternately accelerating and decelerating mode, irrespective of a difference of the characteristics of the individual vehicle operators regarding the timing at which the vehicle operator performs the operation to decelerate the vehicle as a result of reduction of the vehicle-to-vehicle distance. Accordingly, the vehicle can be run in the alternately accelerating and decelerating mode as long as the vehicle-to-vehicle distance is equal to or larger than the threshold value specific to the vehicle operator, which is as small as possible to the extent that makes it possible to avoid the deceleration operation of the vehicle operator when the vehicle comes excessively close to the preceding vehicle in the alternately accelerating and decelerating mode, so that the fuel economy can be effectively improved.

The vehicular drive control apparatus according to the third aspect of the invention is configured such that the learning means compensates the threshold value of the vehicle-to-vehicle distance on the basis of the vehicle-to-vehicle distance detected when the amount of decrease of the operation amount of the above-described accelerator pedal has become equal to or larger than the predetermined upper limit during the running of the vehicle in the alternately accelerating and decelerating mode under the control of the alternately accelerating and decelerating means. Unlike the compensation of the threshold value of the vehicle-to-vehicle distance on the basis of an operation of the vehicle operator to decelerate the vehicle in the steady running state while the vehicle is not running in the alternately accelerating and decelerating mode, the present compensation of the threshold value is implemented by taking account of a rate of variation of the running speed of the vehicle during acceleration of the vehicle in the alternately accelerating and decelerating mode. Thus, the threshold value of the vehicle-to-vehicle distance is set to more stably avoid an operation of the vehicle operator to decelerate the vehicle upon excessive approaching of the vehicle to the preceding vehicle in the alternately accelerating and decelerating mode, making it possible to more stably prevent the deterioration of the fuel economy due to deceleration and acceleration of the vehicle upon excessive approaching of the vehicle to the preceding vehicle.

It is also noted that the timing at which the vehicle operator performs an operation to decelerate the vehicle upon reduction of the vehicle-to-vehicle distance varies depending upon the running environment of the vehicle, such as the running speed of the vehicle, a difference of the running speed of the vehicle in question with respect to that of the preceding vehicle, a gradient of a roadway, the weather, a friction coefficient $\mu$ of a roadway surface, and daytime or nighttime running of the vehicle. According to the fourth aspect of this invention, the threshold value of the vehicle-to-vehicle distance is set according to the running environment of the vehicle, so that the threshold value can be adequately set so as to avoid an operation of the vehicle operator to decelerate the vehicle running in the alternately accelerating and decelerating mode, irrespective of the specific running environment of the vehicle.

The vehicular drive control apparatus according to the fifth aspect of the invention is configured to run the vehicle in the alternately accelerating and decelerating mode under the control of the alternately accelerating and decelerating means, when it is possible to forecast, on the basis of the past running data of the vehicle stored in the memory device in relation to map data, that the steady running state will continue over the predetermined running distance or more of the vehicle. Accordingly, the vehicle can be run in the alternately accelerating and decelerating mode with improved fuel economy, where there is a relatively high degree of probability that the steady running state of the vehicle will continue for a relatively long period of time or over a relatively long running distance of the vehicle.

BRIEF DESCRIPTION OF THE DRAWINGS

FIG. 7 is a view showing one example of a map of a target vehicle acceleration output, which is stored in the memory device of FIG. 3;

FIG. 8 are views for explaining a pulse-driving and gliding mode established by pulse-driving and gliding means shown in FIG. 3, FIG. 8(a) showing operating states of vehicle drive power sources, while FIG. 8(b) being a time chart indicating one example of variation of the vehicle running speed;

MODE FOR CARRYING OUT THE INVENTION

Figure 1:
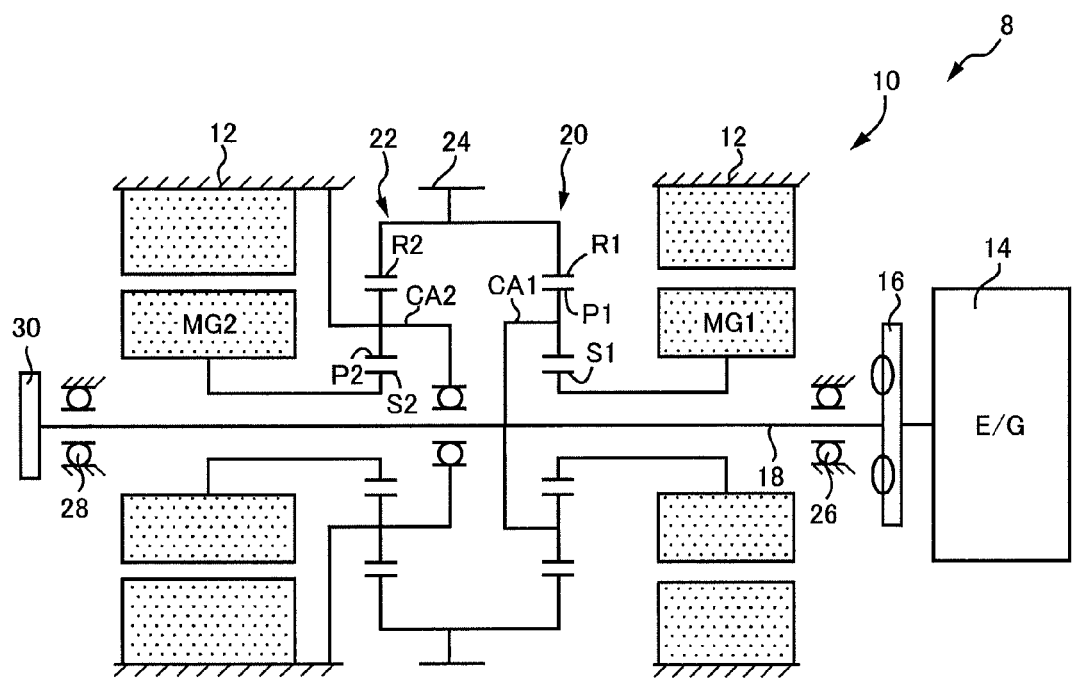
FIG. 1 is a schematic view for explaining one example of a vehicular drive system to which the present invention is suitably applicable.

The present invention is applicable to a drive control apparatus for various types of vehicle such as: hybrid vehicles of parallel, series and split types provided with a plurality of drive power sources such as an engine operable to produce a drive force by combustion of a fuel, and an electric motor or motors; an engine-driven vehicle provided with only an engine as a drive power source; an electric vehicle provided with only an electric motor or motors as a drive power source; and an electric vehicle of a fuel cell type provided with a fuel cell as an electric energy source. Namely, the drive control apparatus according to the invention is configured to effectively control various kinds of drive power source the operating efficiency of which varies depending upon the operating state represented by the operating speed and torque (which defines the operating point), so that the vehicle is run in an alternately accelerating and decelerating mode, in an operating region of the drive power source of a comparatively low operating efficiency, in a steady running state of the vehicle. Thus the fuel efficiency (an efficiency in energy) can be improved.

The control initiating conditions for initiating the vehicle running in the alternately accelerating and decelerating mode include at least a condition that the vehicle is in the steady running state, preferably a condition that it is possible to forecast that the steady running state of the vehicle will continue over a predetermined running distance or more of the vehicle. That is, the drive control apparatus is preferably provided with steady-running-state forecasting means for forecasting that the steady running state of the vehicle will continue over the predetermined running distance or more of the vehicle. For instance, the steady-running-state forecasting means is configured to implement this forecasting on the basis of past running data of the vehicle stored in relation to map data, and the present position of the vehicle obtained from GPS (Global Positioning System) information. Where running routes of the vehicle for which the past running data is not stored are set by the navigation system, the steady-running-state forecasting means can forecast the steady running state of the vehicle on the basis of information on the running routes (straightness, altitude variation, gradient variation, presence and absence of traffic signals, degree of traffic jam, etc. regarding the running routes). It is also preferable to initiate the vehicle running in the alternately accelerating and decelerating mode while a vehicle-to-vehicle distance between the vehicle in question and the preceding vehicle is equal to or lager than a predetermined threshold value, in order to avoid a possibility of deterioration of the fuel economy due to a vehicle decelerating operation of the vehicle operator when the vehicle comes excessively close to the preceding vehicle during the accelerating run, and an vehicle accelerating operation immediately following the vehicle decelerating operation.

The vehicle running in the alternately accelerating and decelerating mode can be implemented in the same manner as disclosed in the above-identified Patent Document 1, for example. Upper and lower limits of the running speed of the vehicle are set on the basis of the present running speed as a parameter, in various manners, for instance, by simply adding and subtracting a predetermined value or a predetermined ratio of a target vehicle running speed to and from the target vehicle running speed (a running speed at the start of the control). The upper and lower vehicle speed limits may be set by taking account of running environment factors other than the vehicle running speed, such as whether the vehicle is running in the daytime or nighttime (whether lights of the vehicle are placed in an on state or not), whether the vehicle is running in a fine or rainy weather condition (whether wipers of the vehicle are placed in an on state or not), and the friction coefficient μ of the roadway surface. Further, it is preferable to accelerate the vehicle by operating the drive power source in an operating region of an operating efficiency as high as possible, and to decelerate the vehicle in a coasting fashion with a running resistance as small as possible. Where a motor/generator is connected to the drive system, the vehicle may be decelerated by operating the motor/generator in a vehicle driving control mode or in a regenerative control mode (electricity generating mode). Where the engine-driven vehicle is decelerated by a fuel cut control of the engine being kept connected to the drive system, the angle of opening of the throttle valve may be suitably regulated for deceleration of the vehicle.

According to the first aspect of this invention, the learning means is configured to reduce the range of variation of the vehicle running speed or the rate of variation of the vehicle running speed, that is, to reduce at least one of the range or rate of variation of the vehicle running speed. The learning means may reduce both of the range and rate of variation of the vehicle running speed. The at least one of the range and rate of variation which is to be reduced by the learning means may be selected depending upon the timing or amount of variation of the operating amount of the accelerator pedal.

Where the range of variation of the vehicle running speed is reduced, the initial value of the range is set to be comparatively large. Where the rate of variation of the vehicle running speed is reduced, the initial value of the rate is set to be comparatively large. The range and rate of variation of the vehicle running speed may be decremented by a predetermined amount, or may be changed depending upon the timing and amount of variation of the operating amount of the accelerator pedal, for example. Where the vehicle runs in the alternately accelerating and decelerating mode have been performed for a predetermined total period of time or more or a predetermined total running distance or more of the vehicle, without the learning compensation of the range and/or rate of variation of the vehicle running speed, the range and/or rate of variation may be increased by gradually cancelling of the learning compensation.

Where the range of variation of the vehicle running speed is reduced during the vehicle running in the alternately accelerating and decelerating mode, both of the upper and lower limits of the vehicle running speed may be changed. However, only one of the upper and lower limits may be subjected to the learning compensation, depending upon the conditions. For instance, only the upper limit is reduced where the operation amount of the accelerator pedal is reduced by a predetermined amount or more during the accelerating run, and only the lower limit is increased where the operation amount of the accelerator pedal is increased by a predetermined amount or more during the decelerating run. Where the rate of variation of the vehicle running speed is reduced during the vehicle running in the alternately accelerating and decelerating mode, too, both of an acceleration value of the vehicle during the accelerating run and a deceleration value of the vehicle during the decelerating run may be changed. However, only one of the acceleration and deceleration values of the vehicle may be subjected to the learning compensation, depending upon the conditions. For instance, only the acceleration value is reduced where the operation amount of the accelerator pedal is reduced by a predetermined amount or more during the accelerating run, and only the deceleration value is reduced where the operation amount of the accelerator pedal is increased by a predetermined amount or more during the decelerating run.

Where the acceleration value of the vehicle running in the accelerating run and/or the deceleration value in the deceleration run is/are changed, it is not necessary to control the acceleration value and/or the deceleration value to specific target values, provided the acceleration value and/or the deceleration value is/are eventually changed. For instance, the acceleration value while the drive power source is operated at a given operating point (defined by the operating speed and torque) during the accelerating run of the vehicle can be reduced by shifting the operating point so as to reduce the torque of the drive power source, and the deceleration value while the motor/generator is operated in the regenerative control mode during the decelerating run of the vehicle can be reduced by reducing the regenerative torque (toward zero). Where the engine-driven vehicle is decelerated, the deceleration value can be reduced by increasing the angle of opening of the throttle valve while the vehicle is coasting with a fuel cut control of the engine being kept connected to the drive system, or by disconnecting the engine from the drive system by placing an automatic transmission in its neutral position.

Where the operation amount of the accelerator pedal has varied by a predetermined amount or more, the learning means compensates the range and/or rate of variation of the running speed of the vehicle running in the alternately accelerating and decelerating mode. In this case, it is preferred to terminate the vehicle running in the alternately accelerating and decelerating mode at the time of this compensation by the learning means, and to restore the running mode of the vehicle to the normal running mode in which the vehicle drive force is changed according to the operation amount of the accelerator pedal.

Since the operation amount of the accelerator pedal varies for a reason not associated with the vehicle running in the alternately accelerating and decelerating mode, the learning compensation is preferably implemented only when predetermined learning conditions are satisfied. Although the amount of variation of the operation amount of the accelerator pedal is comparatively small during the vehicle running in the alternately accelerating and decelerating mode, the operation amount of the accelerator pedal may be zeroed or a braking operation may be performed when the vehicle comes excessively close to the preceding vehicle or when another vehicle turns to run immediately ahead of the operator's vehicle, for example. In this respect, the learning compensation may be inhibited if the amount of variation of the operation amount of the accelerator pedal is equal to or larger than a predetermined upper limit. Further, it is possible to inhibit the learning compensation immediately after the operation amount is varied only once, but to permit the learning compensation only after the operation amount of the accelerator pedal has been varied by a predetermined number of times during predetermined times of the execution of the alternately accelerating and decelerating mode.

The learning means provided according to the second aspect of this invention is configured to implement the learning compensation of a threshold value of the vehicle-to-vehicle distance on the basis of the vehicle-to-vehicle distance at the time when the vehicle operator has performed an operation to decelerate the vehicle running in the steady state. Although the learning means is preferably configured to implement the learning compensation during the vehicle running in the alternately accelerating and decelerating mode under the control of the alternately accelerating and decelerating means, the learning means may implement the learning compensation while the vehicle is running in a steady state other than the alternately accelerating and decelerating state. The operator's operation to decelerate the vehicle may be an operation to reduce the operation amount of the accelerator pedal by a predetermined value, or a braking operation. The threshold value of the vehicle-to-vehicle distance may be compensated by adding a predetermined margin value to the vehicle-to-vehicle distance at the time of the vehicle operator's operation to decelerate the vehicle.

Since the vehicle operator may perform an operation to decelerate the vehicle for a reason not associated with the vehicle approaching to the preceding vehicle, the learning compensation by the learning means provided according to the second aspect of the invention is also preferably implemented only when predetermined learning conditions are satisfied. Although the individual vehicle operators have different characteristics regarding the vehicle-to-vehicle distance below which the vehicle operators operate to decelerate the vehicle in question as a result of approaching of the vehicle in question to the preceding vehicle, for example, a difference of values of the above-indicated vehicle-to-vehicle distance for the individual vehicle operators is held within a given range determined by the running speed and the acceleration value of the vehicle, etc., and the different values of the vehicle-to-vehicle distance are not considerably different from the original threshold value of the vehicle-to-vehicle distance (compensated value). In this respect, the learning compensation may be inhibited where the vehicle-to-vehicle distance is not held within a predetermined range, or is different from the original threshold value of the vehicle-to-vehicle distance by a predetermined upper limit value or more. Further, it is possible to inhibit the learning compensation immediately after the vehicle operator's operation to decelerate the vehicle has been performed only once, but permit the learning compensation only after the vehicle operator's operation has been performed a predetermined number of times, and on the basis of an average of the values of the vehicle-to-vehicle distance at the respective operations of the vehicle operator to decelerate the vehicle.

Since the vehicle-to-vehicle distance at the time of the vehicle operator's operation to decelerate the vehicle in question upon approaching of the vehicle to the preceding vehicle varies depending upon the running environment of the vehicle in question, the threshold value of the vehicle-to-vehicle distance is preferably set according to the running environment. For example, the running environment includes: the running speed of the vehicle; a difference of the running speed of the vehicle in question with respect to that of the preceding vehicle; a gradient of the roadway; weather; a friction coefficient μ of the roadway surface; and whether the vehicle is running in the daytime or nighttime. In such a case, the learning compensation of the threshold value of the vehicle-to-vehicle distance can be performed separately on the basis of the running environment.

First Embodiment

Referring to the drawings, the embodiments of this invention will be described in detail. FIG. 1 is the schematic view for explaining a vehicular drive system 8 of a split-type hybrid vehicle, to which the present invention is suitably applicable. As shown in FIG. 1, the vehicular drive system 8 is constituted by an internal combustion engine in the form of an engine 14 such as a gasoline or diesel engine, and a power transmitting device 10 arranged to transmit a drive force from the engine 14 to drive wheels 40 (shown in FIG. 3). The power transmitting device 10 is provided with; a damper 16 operatively connected to an output shaft (crankshaft, for instance) of the engine 14 and configured to absorb a pulsation due to a torque variation of the engine 14; an input shaft 18 rotated by the engine 14 through the damper 16; a first motor/generator MG1; a first planetary gear set 20 functioning as a power distributing mechanism; a second planetary gear set 22 functioning as a speed reducing device; and a second motor/generator MG2 operatively connected to the drive wheels 40. These damper 16, input shaft 18, first motor/generator MG1, first and second planetary gear sets 20, 22 and second motor/generator MG2 are arranged in the order of description, within a transaxle (T/A) casing 12 (hereinafter referred to simply as "casing 12") which is a stationary member fixed to the body of the vehicle.

This power transmitting device 10 is installed transversely on the vehicle 6 of a front-drive type, namely, of an FF (front-engine front-drive) type, for example, and is suitably configured to drive the drive wheels 40. In the power transmitting device 10, a drive force produced by the engine 14 is transmitted to an output gear 24 which is one of a pair of counter gears 32 (shown in FIG. 3) and which is an output rotary member of the power transmitting device 10. The drive force is then transmitted from the counter gear pair 32 to the pair of drive wheels 40 through a final gear pair 34, a differential gear device (final speed reducing device) 36, a pair of axles 38, etc.

The input shaft 18 is rotatably supported at its opposite ends by ball bearings 26 and 28, and is connected at one of the opposite ends to the engine 14 through the damper 16, so that the input shaft 18 is rotated by the engine 14. To the other end of the input shaft 18, there is connected a lubricant supply device in the form of an oil pump 30, so that the oil pump 30 is operated by a rotary motion of the input shaft 18, to supply a lubricant to various components of the power transmitting device 10, such as the first planetary gear set 20, second planetary gear set 22 and ball bearings 26, 28.

The first planetary gear set 20 is a differential mechanism connected between the engine 14 and the drive wheels 40. This first planetary gear set 20 is a planetary gear set of a single-pinion type provided with three rotary elements rotatable relative to each other, which consist of: a first sun gear S1; a first carrier CA1 supporting a first pinion gear P1 such that the first pinion gear P1 is rotated about its axis and an axis of the planetary gear set 20; and a first ring gear R1 meshing with the first sun gear S1 through the first pinion gear P1. This first planetary gear set 20 is a power distributing mechanism configured to mechanically distribute an output of the engine 14 transmitted to the input shaft 18, to the first motor/generator MG1 and the output gear 24. Namely, in the first planetary gear set 20, the first carrier CA1 is connected to the input shaft 18, that is, to the engine 14, and the first sun gear S1 is connected to the first motor/generator MG1, while the first ring gear R1 is connected to the output gear 24. These first sun gear S1, first carrier CA1 and first ring gear R1 are rotatable relative to each other, so that the output of the engine 14 is distributed to the first motor/generator MG1 and the output gear 24, and so that the first motor/generator MG1 is operated by the output of the engine 14 distributed thereto, to generate an electric energy which is stored in an electric-energy storage device or used to operate the second motor/generator MG2. Thus, the power transmitting device 10 functions as an electrically controlled continuously variable transmission in which the rotating speed of the output gear 24 is continuously variable irrespective of the fixed operating speed of the engine 14, when the differential state of the first planetary gear set 20 is controlled by the first motor/generator MG1 while the power transmitting device 10 is placed in a continuously variable shifting state (electric CVT state).

The second planetary gear set 22 is a planetary gear set of a single-pinion type provided with rotary elements rotatable relative to each other, which consist of: a second sun gear S2; a second carrier CA2 supporting a second pinion gear P2 such that the second pinion gear P2 is rotated about its axis and an axis of the planetary gear set 22; and a second ring gear R2 meshing with the second sun gear S2 through the second pinion gear P2. The ring gear R1 of the first planetary gear set 20 and the ring gear R2 of the second planetary gear set 22 are provided by a one-piece composite gear a radially outer portion of which serves as the output gear 24. In this second planetary gear set 22, the second carrier CA2 is fixed to the stationary member in the form of the casing 12 and is thus prevented from being rotated, and the second sun gear S2 is connected to the second motor/generator MG2, while the second ring gear R2 is connected to the output gear 24. Namely, the second motor/generator MG2 is connected to the output gear 24 and the ring gear R1 of the first planetary gear set 20 through the second planetary gear set 22. Thus, the second sun gear S2 is rotated by an operation of the second motor/generator MG2 upon starting of the vehicle, for instance, and a rotary motion of the second sun gear S2 is transmitted to the output gear 24 after the rotating speed of the second sun gear S2 is reduced by the second planetary gear set 22.

Each of the above-described first motor/generator MG1 and second motor/generator MG2 is operable selectively as an electric motor or an electric generator, that is, operated as the electric motor according to a vehicle driving control, and as the electric generator according to a regenerative control (electricity generating control). These first motor/generator MG1 and second motor/generator MG2 are configured to supply and receive an electric energy to and from each other through an inverter 54.

Figure 2:
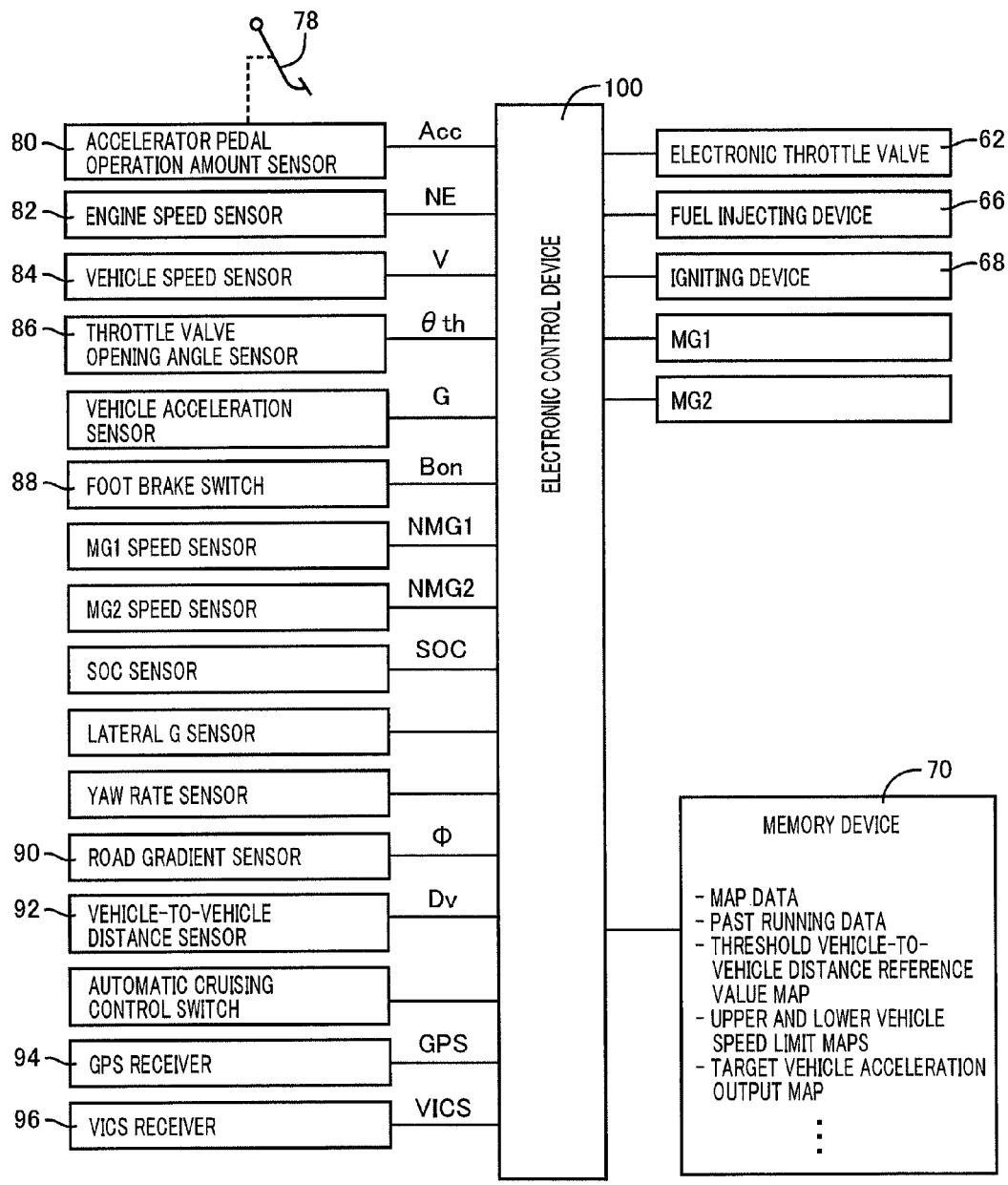
FIG. 2 is a view illustrating input and output signals received and generated from an electronic control device for controlling the vehicular drive system of FIG. 1.

FIG. 2 is the view illustrating input signals received by and output signals generated from an electronic control device 100 as a control device provided for controlling the present vehicular drive system 8. This electronic control device 100 includes a so-called microcomputer incorporating a CPU, a ROM, a RAM and an input/output interface, and operates to perform signal processing operations according to programs stored in the ROM, while utilizing a temporary data storage function of the RAM, for implementing hybrid drive controls of the vehicle, with respect to the engine 14, first motor/generator MG1 and second motor/generator MG2.

The electronic control device 100 receives output signals of various sensors and switches shown in FIG. 2, such as: an output signal of an accelerator pedal operation amount sensor 80 indicative of an operation amount (an angle of operation) Acc of an accelerator pedal 78; an output signal of an engine speed sensor 82 indicative of an operating speed NE of the engine 14 (engine speed NE); an output signal of a vehicle speed sensor 84 indicative of a vehicle running speed V; an output signal of a throttle valve opening angle sensor 86 indicative of an angle θth of opening of an electronic throttle valve 62 (throttle valve opening angle θth); an output signal of a vehicle acceleration sensor indicative of a longitudinal acceleration value G of the vehicle 6; an output signal of a foot brake switch 88 indicating an operated state Bon of a foot brake pedal for a regularly used braking system; an output signal of a MG1 speed sensor indicative of an operating speed NMG1 of the first motor/generator MG1; an output signal of a MG2 speed sensor indicative of an operating speed NMG2 of the second motor/generator MG2; an output signal of an SOC sensor indicative of an amount of electric energy stored in (a state of charging of) the electric-energy storage device 56; an output signal indicative of an amount of lateral G of the vehicle 6 detected by a lateral G (gravity) sensor; an output signal of a yaw rate sensor indicative of a yaw rate of the vehicle 6; an output sensor of a road gradient sensor 90 indicative of a gradient φ of a roadway; an output signal of a vehicle-to-vehicle distance sensor 92 such as a radar, indicative of a distance Dv of the vehicle 6 to the preceding vehicle; an output signal of an automatic cruising switch operable by an operator, of the vehicle 6 to run the vehicle in an automatic cruising control mode; an output signal of a GPS (Global Positioning System) receiver 94 indicative of GPS information relating to a present position $P_V$ of the vehicle 6; and an output signal of a VICS (Vehicle Information and Communication System) receiver 96 indicative of VICS information relating to a friction coefficient μ of a roadway surface and a state of traffic jam. The engine speed NE corresponds to a rotating speed Nin of the input shaft 18 (input shaft speed Nin), and the vehicle running speed V corresponds to a rotating speed Nout of the output gear 24 (output speed Nout), while the operation amount Acc of the accelerator pedal corresponds to a vehicle output amount required by the vehicle operator. The friction coefficient μ of the roadway surface may be obtained on the basis of a temperature of the roadway surface detected by a thermometer, to determine that the roadway surface has a low degree of friction coefficient μ if the roadway surface is frozen, for instance.

The above-described electronic control device 100 generates output signals such as: control signals to be applied to an engine output control device 58 (shown in FIG. 3) for controlling the engine output, these control signals including a drive signal to be applied a throttle actuator 64 for controlling an opening angle θth of an electronic throttle valve 62 disposed in an intake pipe 60 of the engine 14, a fuel supply amount control signal to be applied to a fuel injecting device 66 for controlling an amount of injection of a fuel into the intake pipe 60 or into cylinders of the engine 14, and an ignition control signal to be applied to an igniting device 68 for controlling an ignition timing of the engine 14; and MG control signals for operating the first motor/generator MG1 and the second motor/generator MG2. The electronic control device 100 is provided with a memory device 70 memory contents of which can be updated from time to time and retained even while power is removed from the memory device 70. The memory device 70 stores: map data of a navigation system; past running data of the vehicle (such as the vehicle running speed V and accelerator pedal operation amount Acc) stored in relation to the map data; a threshold vehicle-to-vehicle distance reference value map relating to a reference value HSK(V) of a threshold vehicle-to-vehicle distance used for alternately accelerating and decelerating the vehicle so as to improve the fuel economy; upper and lower vehicle speed limit maps relating to an upper vehicle speed limit Vhi and a lower vehicle speed limit Vlo; and a target vehicle acceleration output map relating to a target vehicle acceleration output Pp.

Figure 3:
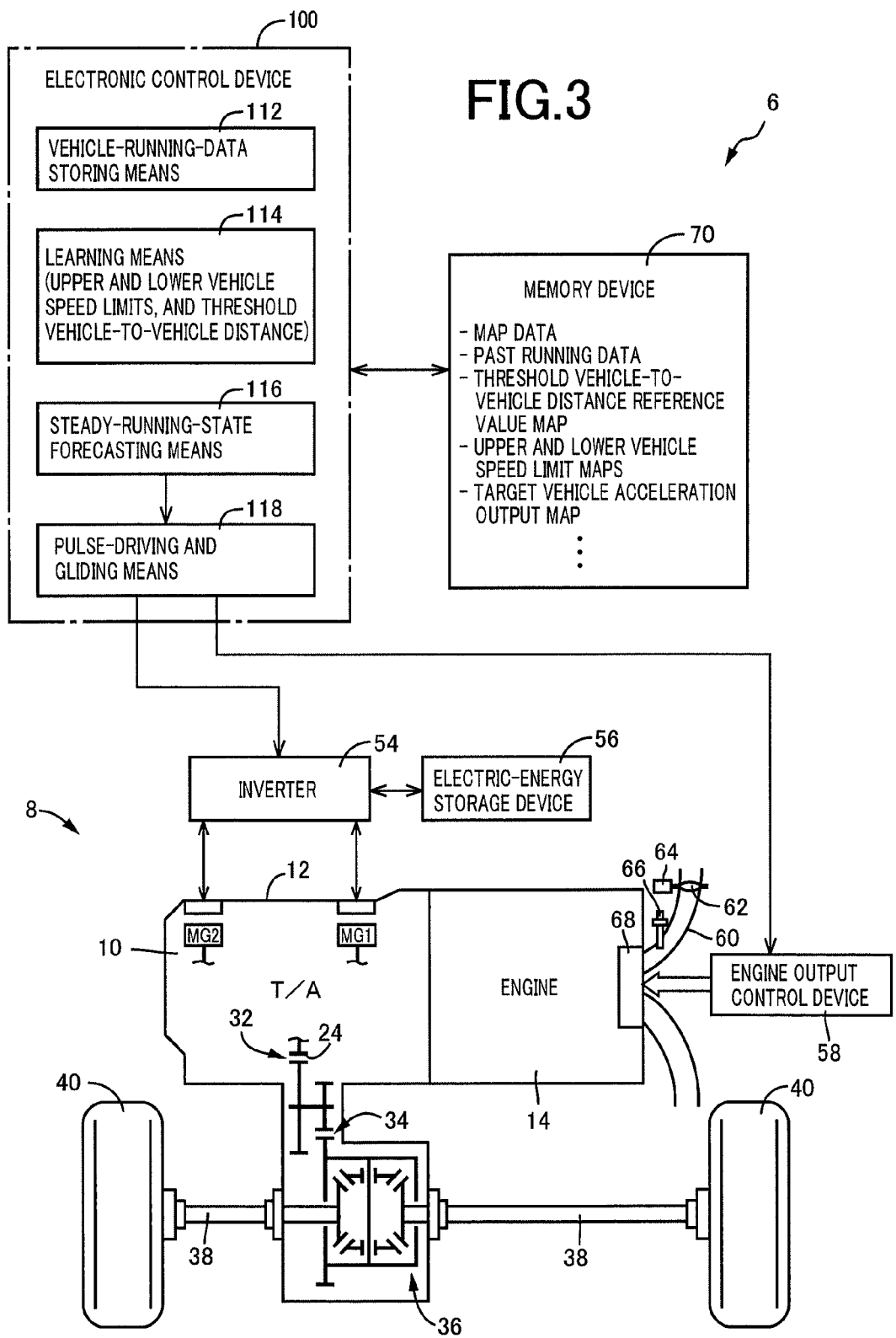
FIG. 3 is a block diagram for explaining major components of a power transmitting system connected to drive wheels of a vehicle having the vehicular drive system of FIG. 1, and major control functions of the electronic control device of FIG. 2.

As shown in FIG. 3, the above-described electronic control device 100 is functionally provided with vehicle-running-data storing means 112; learning means 114; steady-running-state forecasting means 116; and pulse-driving and gliding means 118. The vehicle-running-data storing means 112 is configured to store in the memory device 70 the past running data such as the vehicle running speed V and accelerator pedal operation amount Acc, in relation to the map data. The past running data consists of values of the vehicle running speed V and accelerator pedal operation amount Acc, which values were stored with a cycle time corresponding to a predetermined vehicle running distance (e.g., several meters to several tens of meters). The past running data regarding roadways on which the vehicle has frequently run for a purpose of commutation, for example, represents average values of a plurality of last sets of data (e.g., five sets of data).

The steady-running-state forecasting means 116 is configured to forecast that a steady running state of the vehicle in which the vehicle can be run in a pulse-driving and gliding mode will be kept over a predetermined running distance or more (e.g., several hundreds of meters) of the vehicle. For instance, the steady-running-state forecasting means 116 determines whether the steady running state of the vehicle in which the rate of variation of the accelerator pedal operation amount Acc represented by the above-indicated past running data is held within a predetermined range (e.g., several % values) while the rate of variation of the vehicle running speed V represented by the past running data is held within a predetermined range (e.g., several kilometers/hour) will continue over a predetermined running distance or more (e.g., about several hundreds of meters) of the vehicle from the present position Pv represented by the above-indicated GPS information. The steady running state of the vehicle may be forecast according to the present position Pv and the direction of running of the vehicle, with respect to areas of the steady running state of the vehicle defined in the map data on the basis of the past running data of the vehicle. The degree of traffic jam obtained from the VICS information may be taken into account when the steady-running-state forecasting means determines whether the vehicle is running in the steady state or not. Where running routes of the vehicle for which the past running data is not stored are set by the navigation system, the steady state of running of the vehicle can be forecast on the basis of data of the running routes (straightness, altitude variation, gradient variation, presence and absence of traffic signals, degree of traffic jam, etc. regarding the roadway) without the past running data.

Figure 4:
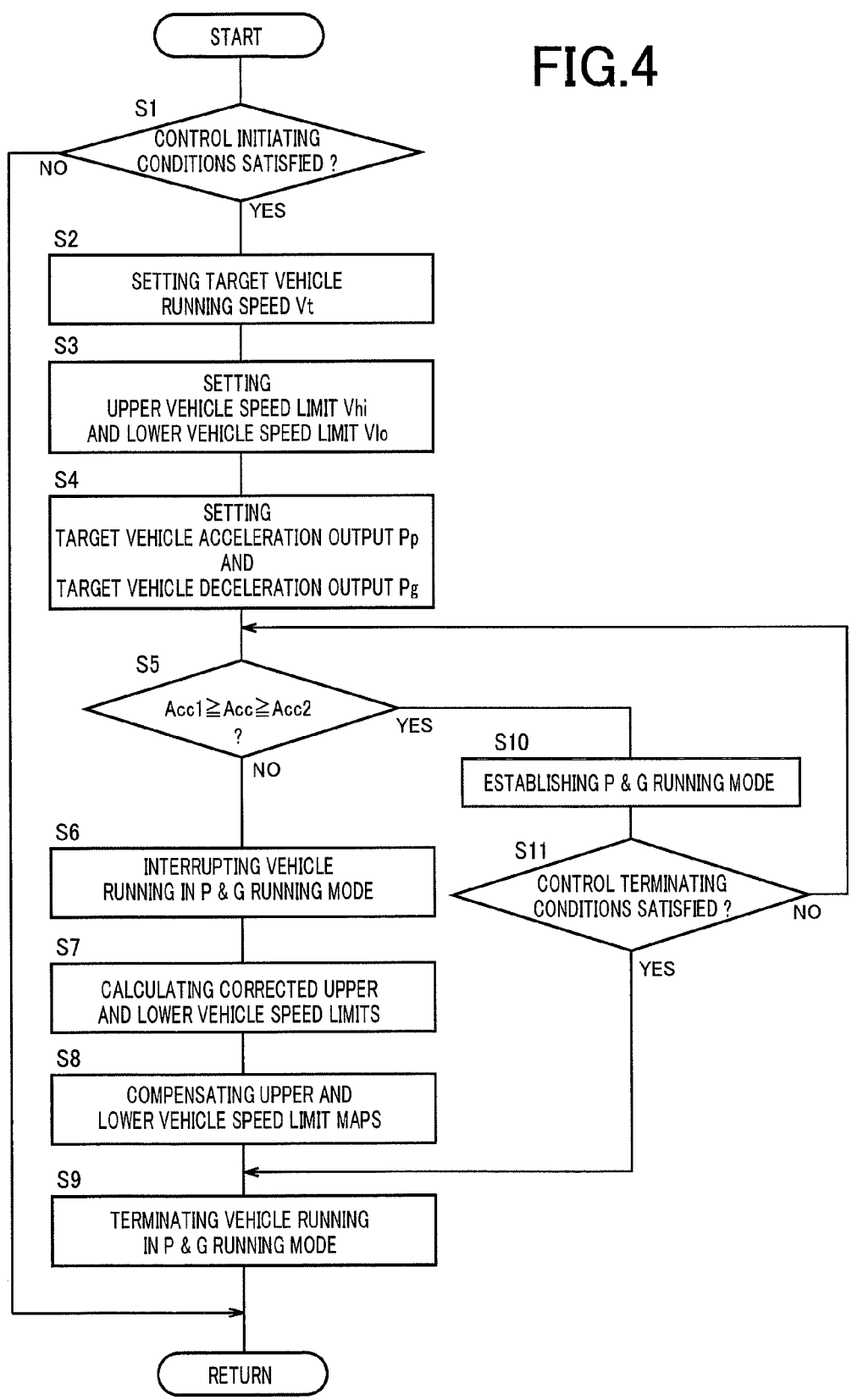
FIG. 4 is a flow chart for explaining in detail operations of pulse-driving and gliding means and learning means which are shown in FIG. 3.

The pulse-driving and gliding means 118 is alternately accelerating and decelerating means for running the vehicle in the pulse-driving and gliding mode by alternately repeating a pulse-driving run (accelerating run) of the vehicle with the engine 14 operated as the drive power source, and a gliding run (gliding run or decelerating run) of the vehicle, at the running speed varying between the predetermined upper vehicle speed limit Vhi and lower vehicle speed limit Vlo, during the steady state of running of the vehicle, so as to improve the fuel economy. The learning means 114 is configured to implement learning compensation of the upper and lower vehicle speed limit maps and the threshold vehicle-to-vehicle distance reference value map used during running of the vehicle in the pulse-driving and gliding mode. FIG. 4 is the flow chart for explaining in detail signal processing operations of the pulse-driving and gliding means 118 and the learning means 114. Steps S1-S4 and S9-S11 correspond to the pulse-driving and gliding means 118 while steps S5-S8 correspond to the learning means. The pulse-driving and gliding mode corresponds to the alternately accelerating and decelerating mode, and is hereinafter referred to simply as a "P & G running mode".

Step S1 of FIG. 4 is implemented to determine whether predetermined control initiating conditions for initiating the vehicle running in the P & G running mode have been satisfied or not. If the control initiating conditions have been satisfied, the control flow goes to step S2 and the subsequent steps to run the vehicle in the P & G running mode. The control initiating conditions consist of the following conditions (a), (b) and (c):
(a) The above-described steady-running-state forecasting means 116 has forecasted the steady state of running of the vehicle over the predetermined distance or more.
(b) The vehicle is currently in the steady running state, i.e., the rate of variation of the accelerator pedal operation amount Acc is held within the predetermined range (e.g., several % values) while the rate of variation of the vehicle running speed V is held within the predetermined range (e.g., several kilometers/hour).
(c) The distance Dv to the preceding vehicle detected by the vehicle-to-vehicle distance sensor 92 is equal to or more than a predetermined threshold value SK.

Figure 5:
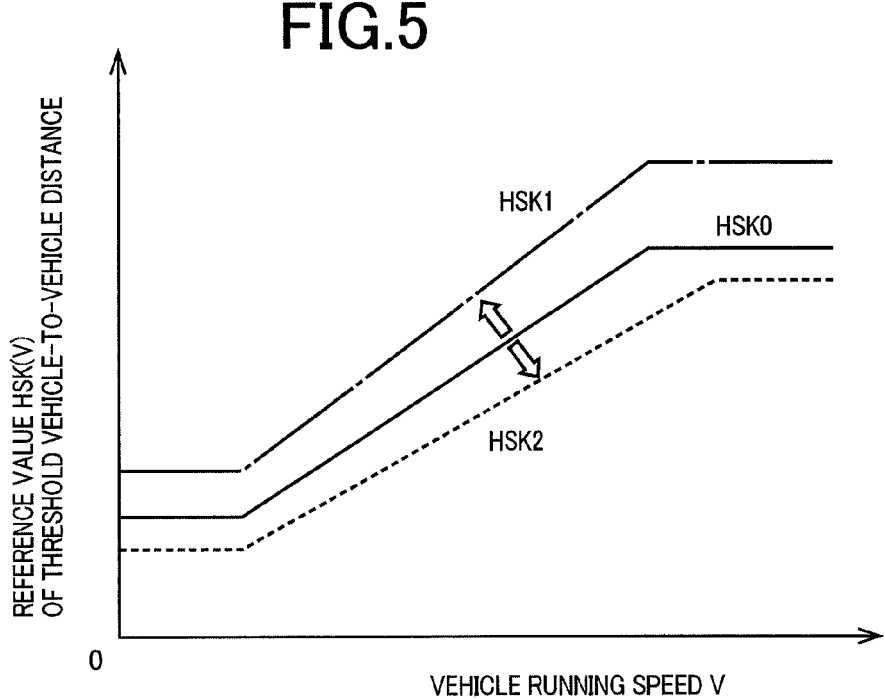
FIG. 5 is a view showing one example of a map of a reference value of a threshold vehicle-to-vehicle distance, which is stored in a memory device of FIG. 3.

The above-indicated threshold value SK is determined to permit the initiation of the vehicle running in the P & G running mode under the condition that the distance to the preceding vehicle is equal to or more than the threshold value SK, to avoid a possibility of deterioration of the fuel economy due to a braking or other vehicle decelerating operation of the vehicle operator when the vehicle comes excessively close to the preceding vehicle, and a vehicle accelerating operation immediately following the vehicle decelerating operation when the P & G running mode is implemented under the condition that the distance to the preceding vehicle is relatively small. The threshold value SK is calculated according to the following equation (1) including the referenced value HSK(V) which is obtained on the basis of the vehicle running speed V and according to a threshold vehicle-to-vehicle distance reference value map as shown in FIG. 5 stored in the memory device 70. The threshold vehicle-to-vehicle distance reference value map is formulated such that an initial value HSK0 of the reference value HSK(V) varies with a parameter of the vehicle running speed V. However, this initial value HSK0 is subjected to the learning compensation by the learning means 114, to obtain a compensated value as represented by HSK1 or HSK2, by way of example, depending upon a difference of the characteristics of the individual vehicle operators regarding the timings (vehicle-to-vehicle distance) at which they release the accelerator pedal and depress the brake pedal when the vehicle in question comes close to the preceding vehicle.

$$SK = HSK(V) + HSS(V) + HL + HW + HK + HT \quad (1)$$

The above-indicated equation (1) is an arithmetic equation for compensating the threshold vehicle-to-vehicle distance value SK according to the vehicle running environment. The value HSS(V), which is a compensating value varying with a difference between the running speeds of the vehicle in question and the preceding vehicle, is a positive value when the running speed of the preceding vehicle is lower than that of the vehicle in question. The value HSS(V) is determined on the basis of a parameter of the running speed V such that the threshold value SK increases with an increase of the running speed difference. The determined value HSS(V) is stored in the memory device 70, for example. The running speed difference is obtained on the basis of a rate of change of the vehicle-to-vehicle distance Dv detected by the above-described vehicle-to-vehicle distance sensor 92. The value HL is a compensating value used when lights of the vehicle are placed in an on state, namely, when the vehicle is running in the night. The value HW is a compensating value used when a wiper of the vehicle in an on state, namely, when the vehicle is running in a rainy weather condition. These values HL and HW are positive constant values predetermined so as to increase the threshold value SK, and the predetermined constant values are stored in the memory device 70. The value HK is a compensating value determined depending upon the roadway gradient $\phi$, and is a positive value when the roadway is an upslope. The value HK is determined with a parameter of gradient variation $\phi$ such that the threshold value SK decreases with an increase of the roadway gradient $\phi$. The determined value HK is stored in the memory device 70. The value HT is a compensating value used when the roadway friction coefficient $\mu$ is low. The value HT is a positive constant or variable value determined on the basis of a parameter of the roadway friction coefficient so as to increase the threshold value SK and stored is in the memory device 70.

Figure 6:
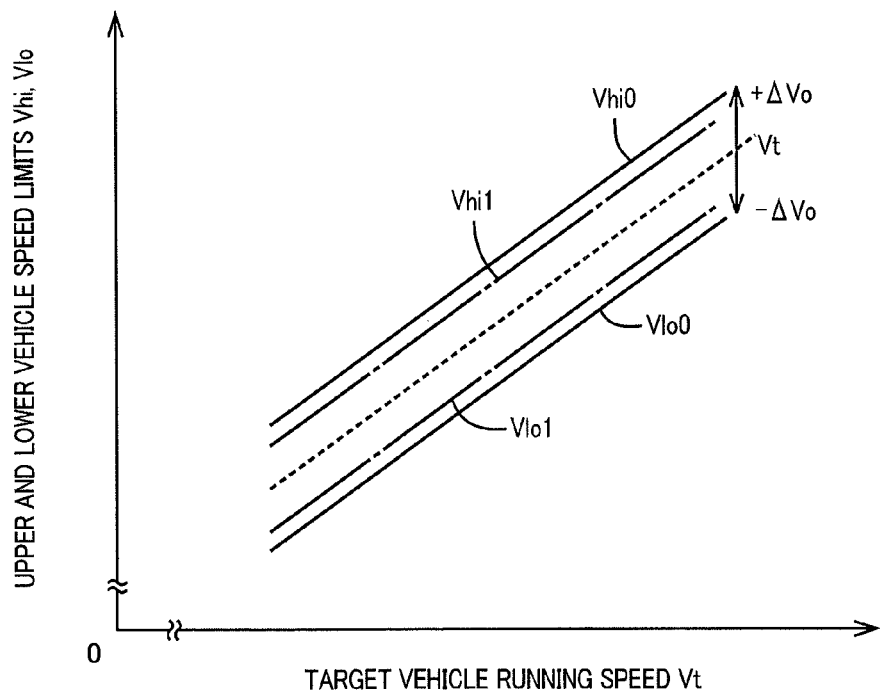
FIG. 6 is a view showing one example of maps of upper and lower vehicle speed limits, which are stored in the memory device of FIG. 3.

If the above-indicated control initiating conditions have been satisfied, that is, if an affirmative determination (YES) is obtained in the step S1, the control flow goes to step S2 to set the present vehicle running speed V as a target vehicle running speed Vt. In step S3, the upper and lower vehicle speed limits Vhi and Vlo are set on the basis of the target vehicle running speed Vt and according to the upper and lower vehicle speed limit maps as shown in FIG. 6 stored in the memory device 70. The upper and lower vehicle speed limit maps are formulated such that initial values Vhi0 and Vlo0 of the upper and lower vehicle speed limits vary with the target vehicle running speed Vt as a parameter, as indicated by solid lines. However, these initial values Vhi0 and Vlo0 are subjected to the learning compensation by the learning means 114, to obtain compensated values Vhi1 and Vlo1 indicated by one-dot chain lines, by way of example, depending upon a difference of the characteristics of the individual vehicle operators regarding a range of variation of the vehicle running speed V during running of the vehicle in the P & G running mode, so as to permit the vehicle running speed V during the vehicle running in the P & G running mode to vary within a range as broad as possible to the extent that the vehicle operator does not recognize the vehicle running in the P & G running mode. The upper and lower vehicle speed limits Vhi0 and Vlo0 (initial values) defined in the upper and lower vehicle speed limit maps of FIG. 6 are respectively higher and lower than the target vehicle running speed Vt by a predetermined permissible amount $\Delta$Vo (e.g., about 5 km/hour) of variation of the vehicle running speed V. This permissible amount ΔVo of variation is determined to be comparatively large, and the initial values Vhi0 and Vlo0 are respectively replaced by the compensated values Vhi1 and Vlo1 indicated by way of example, to reduce the permissible amount ΔVo when the vehicle operator recognizes the vehicle running in the P & G running mode. However, the upper and lower vehicle speed limits Vhi and Vlo may be set such that the permissible amount ΔVo varies continuously according to the target vehicle running speed Vt.

In the following step S4, the target vehicle acceleration output Pp is set on the basis of the target vehicle running speed Vt and according to the target vehicle acceleration output map as shown in FIG. 7 stored in the memory device 70. The target vehicle acceleration output map is formulated to set the target vehicle acceleration output Pp on the basis of parameters of the target vehicle running speed Vt and the roadway gradient φ such that the target vehicle acceleration output Pp increases with an increase of the target vehicle running speed Vt and an increase of the roadway gradient φ, and such that the target vehicle acceleration output Pp is a positive value when the roadway is an upslope. This target vehicle acceleration output Pp is an engine output during the pulse-driving run of the vehicle in the P & G running mode, which is determined on the basis of the target vehicle running speed Vt and the roadway gradient φ and according to an operating efficiency map of the engine 14, so as to enable the engine 14 to operate in an operating region of a comparatively high operating efficiency. In the pulse-driving run of the vehicle indicated in FIG. 8(a), the first motor/generator MG1 is controlled to be placed in a regenerative state to generate a predetermined regenerative torque, while the second motor/generator MG2 is placed in a free state without generation of a torque or in a vehicle driving state as occasion demands.

In the above-indicated step S4, the target vehicle deceleration output Pg is also set. In the present embodiment, however, the target vehicle deceleration output Pg is set to be zero. Namely, in the gliding run of the vehicle indicated in FIG. 8(a), both of the first motor/generator MG1 and the second motor/generator MG2 are placed in the free state where torque of each motor/generator is zero, and while the engine 14 is disconnected from the drive system and held in the non-operated state, so that the vehicle 6 is run in a coasting state (gliding state) with a minimum running resistance. The non-operated state of the engine 14 is established by a fuel cut control, and does not necessarily mean the absence of a rotary motion of the engine 14. That is, the rotary motion of the engine 14 depends upon a relationship between a resistance generated by friction and a pumping loss of the engine 14, and a resistance to a rotary motion of the first motor/generator MG1. In one form of modification of the gliding run, the first motor/generator MG1 is controlled not to generate a torque, while the engine 14 is placed in its idling state. In another form of modification of the gliding run, the engine 14 is placed in its idling state so as to generate an engine braking force, while the first motor/generator MG1 is placed in a regenerative state or in a vehicle driving state so as to generate a vehicle driving force. The second motor/generator MG2 may be controlled to be placed in the vehicle driving state or the regenerative state, so as to decelerate the vehicle.

Step S5 is implemented to determine whether the accelerator pedal operation amount Acc is equal to or smaller than a predetermined upper limit Acc1 and equal to or larger than a predetermined lower limit Acc2, that is, to determine whether an amount of variation of the accelerator pedal operation amount Acc is equal to or smaller than a predetermined value. Those upper and lower limits Acc1 and Acc2 are respectively larger and smaller than the accelerator pedal operation amount Acc0 upon the affirmative determination (YES) in the step S1 with the predetermined control initiating conditions being satisfied, by an amount ΔAcc of about several % values of the operation amount Acc0 which may be caused due to vibration of the vehicle or any other factor which causes a variation of the operation amount Acc without an intention of the vehicle operator. The control flow goes to step S10 where Acc1≥Acc≥Acc2, and to step S6 and the subsequent steps where Acc1<Acc or where Acc<Acc2.

Where the step S10 is implemented in the state of Acc1≥Acc≥Acc2, it is considered that the vehicle is placed in a steady state of running in the P & G running mode, without a substantial variation of the accelerator pedal operation amount Acc and without the vehicle operator's recognition of an increase and a decrease of the vehicle running speed and acceleration and deceleration of the vehicle. In this condition, therefore, the P & G running mode is established to implement alternate repetition of the pulse-driving run and the coasting or gliding run in the states indicated in FIG. 8(a), with a result of variation of the vehicle running speed V in a saw-toothed pattern between the upper and lower vehicle speed limits Vhi and Vlo set in the above-described step S3. FIG. 8(b) is a time chart indicating an example of variation of the vehicle running speed V in the P & G running mode. Solid lines in FIG. 8(b) indicate the variation of the vehicle running speed V where the initial values Vhi0 and Vlo0 of the upper and lower vehicle speed limits are set according to the above-described upper and lower vehicle speed limit maps, while one-dot chain lines indicate the variation of the vehicle running speed V where the values Vhi1 and Vlo1 are set by the learning compensation according to the upper and lower vehicle speed limit maps. In both of the cases of the solid and one-dot chain lines, the pulse-driving run is changed to the gliding run when the vehicle running speed V has been raised to the upper limit Vhi0 or Vhi1, and the gliding run is changed to the pulse-driving run when the vehicle running speed V has been lowered to the lower limit Vlo0 or Vlo1.

The following step S11 is implemented to determine whether control terminating conditions for terminating the running of the vehicle in the P & G running mode have been satisfied or not. Although the control terminating conditions may correspond to the control initiating conditions described above with respect to the step S1, it is preferable to provide a suitable hysteresis for preventing a control hunting phenomenon. For terminating the vehicle running the P & G running mode before the vehicle operator feels uneasy about the P & G running mode, the control terminating conditions preferably include a condition or conditions of a kind or kinds different from that or those of the control initiating conditions. The above-described step S5 and the following steps are repeatedly implemented until the control terminating conditions have been satisfied. When the control terminating conditions have been satisfied, the control flow goes to step S9 to terminate the vehicle running in the P & G running mode, and to restore the vehicle drive control mode to a normal mode in which the engine 14, first motor/generator MG1 and second motor/generator MG2 are controlled so as to produce a vehicle drive force according to the accelerator pedal operation amount Acc.

If the accelerator pedal operation amount Acc in the P & G running mode has exceeded the upper limit Acc1, namely, if the vehicle operator has intentionally depressed the accelerator pedal 78 in the P & G running mode to increase the operation amount Acc, or if the accelerator pedal operation amount Acc in the P & G running mode has been reduced below the lower limit Acc2, namely, if the vehicle operator has intentionally released the accelerator pedal 78 to reduce the operation amount Acc in the P & G running mode, a negative determination (NO) is obtained in the above-described step S5, and the control flow goes to step S6 and the following steps. The step S6 is implemented to interrupt the vehicle running in the P & G running mode, and the step S7 is implemented to calculate the corrected or compensated upper and lower vehicle speed limits Vhi1 and Vlo1 on the basis of the vehicle running speed V at the time when the negative determination (NO) is obtained in the above-described step S5. Namely, where Acc1<Acc, it is considered that the vehicle operator has depressed the accelerator pedal 78 to increase the operation amount Acc as a result of recognition of a drop of the vehicle running speed V. In this case, therefore, the present vehicle running speed V or a value slightly higher than the present vehicle running speed V is set as the corrected lower vehicle speed limit Vlo1 to change the above-indicated permissible amount ΔVo of variation of the vehicle running speed V, and the corrected upper vehicle speed limit Vhi1 is set on the basis of the changed permissible amount ΔVo. Where Acc<Acc2, it is considered that the vehicle operator has released the accelerator pedal 78 to reduce the operation amount Acc as a result of recognition of a rise of the vehicle running speed V. In this case, therefore, the present vehicle running speed V or a value slightly lower than the present vehicle running speed V is set as the corrected upper vehicle speed limit Vhi to change the permissible amount ΔVo, and the corrected lower vehicle speed limit Vlo1 is set on the basis of the changed permissible amount ΔVo.

Then, the upper and lower vehicle speed limit maps of FIG. 6 stored in the above-described memory device 70 are compensated on the basis of the corrected upper and lower vehicle speed limits Vhi1 and Vlo1, if predetermined learning compensation conditions have been satisfied. In the subsequent vehicle running in the P & G running mode, the thus updated upper and lower vehicle speed limits Vhi1 and Vlo1 are used. One-dot chain lines in FIG. 6 indicate an example of the learning compensation of the upper and lower vehicle speed limit maps on the basis of the corrected upper and lower vehicle speed limits Vhi1 and Vlo1. In the vehicle running in the P & G running mode according to the corrected upper and lower vehicle speed limits Vhi1 and Vlo1 of the thus compensated map, the permissible amount of variation of the vehicle running speed V is reduced, so that the vehicle operator is less likely to recognize a variation of the vehicle speed V. The above-indicated learning compensation conditions are determined for preventing the learning compensation of the upper and lower vehicle speed limit maps as a result of variation of the accelerator pedal operation amount Acc not caused by the vehicle running in the P & G running mode. Where the vehicle operator varies the accelerator pedal operation amount Acc as a result of recognition of the vehicle running in the P & G running mode, the amount of variation of the accelerator pedal operation amount Acc is comparatively small. Where the vehicle operator decelerates the vehicle when the vehicle comes excessively close to the preceding vehicle or when another vehicle turns to run immediately ahead of the operator's vehicle, the accelerator pedal operation amount Acc is zeroed, or an operation to brake the vehicle is performed by the vehicle operator. In this respect, the learning compensation of the map may be inhibited where the amount of variation of the accelerator pedal operation amount Acc is equal to or larger than a predetermined upper limit. Further, it is possible to inhibit the learning compensation immediately after the accelerator pedal operation amount Acc is varied only once, but to permit the learning compensation only after the accelerator pedal operation amount Acc has been varied a predetermined number of times or more during predetermined times of P & G running mode. In the present embodiment, the learning compensation is implemented to substantially change the permissible amount ΔVo for all values of the target vehicle running speed Vt. However, the permissible amount ΔVo, that is, the corrected upper and lower vehicle speed limits Vhi1 and Vlo1 may be changed (by the learning compensation) differently depending upon the respective different values of the target vehicle running speed Vt.

Then, the above-indicated step S9 is implemented to terminate the vehicle running in the P & G running mode and to restore the vehicle drive control mode to the normal mode in which the engine 14, first motor/generator MG1 and second motor/generator MG2 are controlled so as to produce the vehicle drive force according to the accelerator pedal operation amount Acc.

Figure 9:
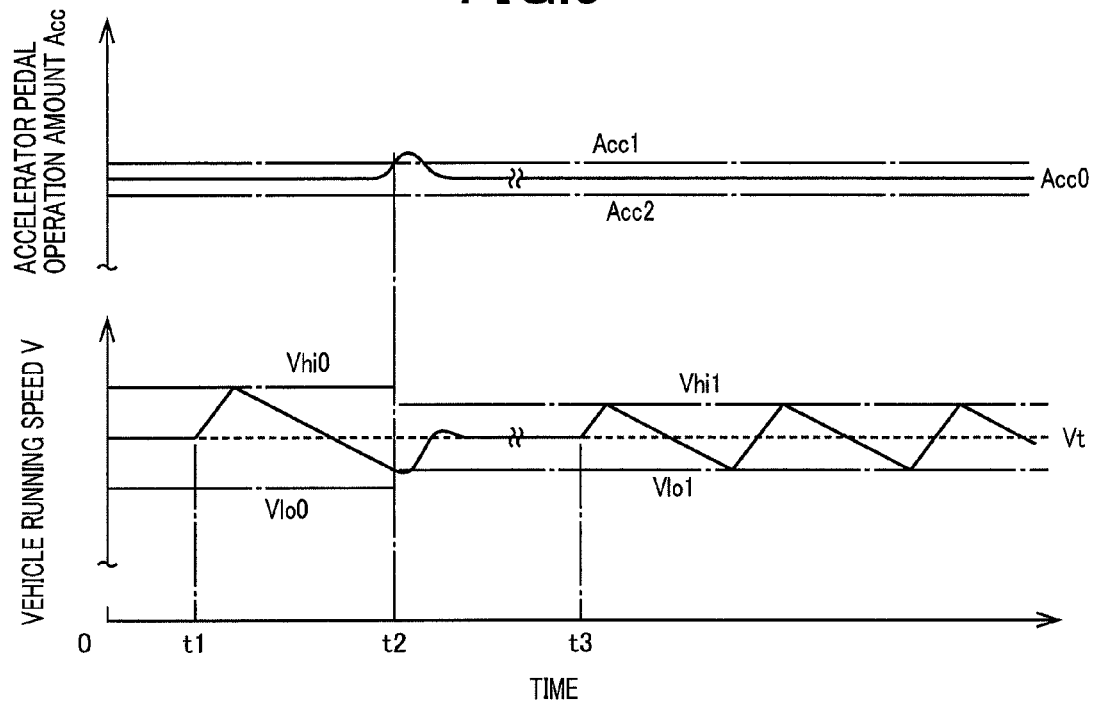
FIG. 9 is a time chart indicating examples of variations of the vehicle running speed and an operation amount of an accelerator pedal during vehicle running in a pulse-driving and gliding mode according to the flow chart of FIG. 4, with learning compensation of the upper and lower vehicle speed limits Vhi and Vlo.

FIG. 9 is the time chart indicating examples of variations of the accelerator pedal operation amount Acc and the vehicle running speed V during the vehicle running in the P & G running mode according to the above-described flow chart of FIG. 4, with the learning compensation of the upper and lower vehicle speed limits Vhi and Vlo. At a point of time t1, the control initiating conditions are satisfied so that the affirmative determination (YES) is obtained in the step S1. In this case, the upper and lower vehicle speed limits Vhi0 and Vlo0 are set according to the map of the initial values, and the vehicle is run in the P & G running mode such that the vehicle running speed V varies between the upper and lower vehicle speed limits Vhi0 and Vlo0. At a point of time t2, the accelerator pedal 78 is further depressed by the vehicle operator as a result of recognition of a drop of the vehicle running speed V, and that the accelerator pedal operation amount Acc has exceeded the upper limit Acc1, so that the negative determination (NO) is obtained in the step S5, whereby the steps S7 and S8 are implemented to implement the learning compensation on the basis of the present vehicle running speed V and the corrected upper and lower vehicle speed limits Vhi1 and Vlo1, and the step S9 is implemented to terminate the vehicle running in the P & G running mode. At a point of time t3, the control initiating conditions of the P & G running mode are again satisfied; and the vehicle is run in the P & G running mode with the same target vehicle running speed Vt. In this case, the upper and lower vehicle speed limits Vhi1 and Vlo1 are set according to the compensated upper and lower vehicle speed limit maps, so that the vehicle is run in the P & G running mode at the vehicle running speed V which varies within a comparatively narrow range between the upper and lower vehicle speed limits Vhi1 and Vlo1.

Figure 10:
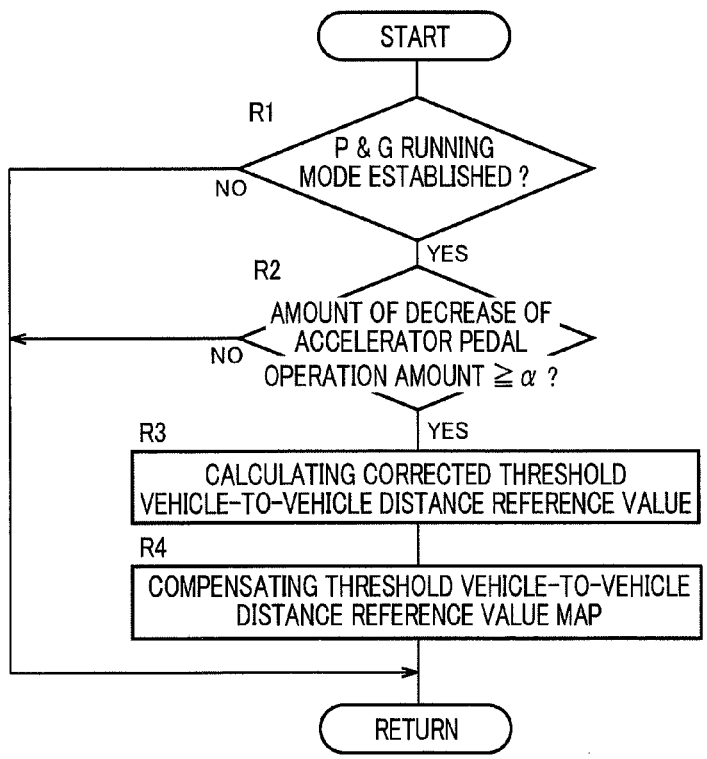
FIG. 10 is a flow chart for explaining an operation of the learning means of FIG. 3 for implementing the learning compensation of the map of the reference value of the threshold vehicle-to-vehicle distance.

The above-described learning means 114 is also configured to implement the learning compensation of the above-indicated threshold vehicle-to-vehicle distance reference value HSK(V), by performing signal processing operations according to the flow chart of FIG. 10. Step R1 of FIG. 10 is implemented to determine whether the P & G running mode has been established. If the P & G running mode has been established, the control flow goes to step R2 and the following steps. The step R2 is implemented to determine whether an amount of releasing operation of the accelerator pedal 78 has become equal to or larger than a predetermined upper limit α, or not, that is, whether an amount of variation of the accelerator pedal operation amount Acc in the decreasing direction has become equal to or larger than the upper limit α. If the amount of decrease is equal to or larger than the predetermined upper limit α, the control flow goes to step R3. The predetermined value α is determined to determine whether the vehicle operator has released the accelerator pedal to decelerate the vehicle 6 which has come excessively close to the preceding vehicle, namely, whether the amount of decrease of the accelerator pedal operation amount Acc has exceeded the above-indicated lower limit Acc2 which is determined to detect a releasing operation of the accelerator pedal 78 by the vehicle operator who has felt uneasy about the acceleration of the vehicle during the vehicle running in the P & G running mode. The determination in the step R3 may be made by determining whether the accelerator pedal operation amount Acc has been substantially zeroed, for instance. Alternately, the determination may be made by determining whether the output signal of the foot brake switch 88 indicative of the operated state Bon of the foot brake has been generated or not.

If the amount of decrease of the operation amount of the accelerator pedal 78 has become equal to or larger than the predetermined value cc, and an affirmative determination (YES) is obtained in the step R2, the control flow goes to step R3 to calculate the corrected threshold vehicle-to-vehicle distance reference value on the basis of the vehicle-to-vehicle distance Dv detected by the above-described vehicle-to-vehicle distance sensor 92 when the affirmative determination (YES) is obtained in the step R2. This corrected threshold vehicle-to-vehicle distance reference value is equal to the vehicle-to-vehicle distance Dv when the affirmative determination (YES) is obtained in the step R2 with the releasing operation of the accelerator pedal 78, plus a predetermined margin value which is determined by taking account of approaching of the vehicle to the preceding vehicle due to the vehicle acceleration in the P & G running mode.

If the predetermined learning compensation conditions are satisfied, the threshold vehicle-to-vehicle distance reference value relating to the present vehicle running speed V (target vehicle running speed Vt) and defined in the threshold vehicle-to-vehicle distance reference value map of FIG. 5 stored in the above-described memory device 70 is replaced by the above-indicated corrected threshold vehicle-to-vehicle distance reference value, and the determination as to whether the control initiating conditions are satisfied or not is subsequently made according to the thus updated threshold vehicle-to-vehicle distance reference value map. The threshold vehicle-to-vehicle distance threshold values HSK1 and HSK2 respectively represented by the one-dot chain line and the broken line in FIG. 5 are examples of the corrected threshold vehicle-to-vehicle distance reference values obtained by the learning compensation. The threshold vehicle-to-vehicle distance reference value HSK1 permits the vehicle running with a comparatively large vehicle-to-vehicle distance, while the threshold vehicle-to-vehicle distance reference value HSK2 permits the vehicle running with a comparatively small vehicle-to-vehicle distance. Thus, the threshold vehicle-to-vehicle distance map is updated by the learning compensation depending upon the different characteristics of the individual vehicle operators, so as to minimize the threshold vehicle-to-vehicle distance to the extent that can avoid a releasing operation of the accelerator pedal 78 or any other operation by the vehicle operator to decelerate the vehicle when the vehicle comes excessively close to the preceding vehicle during the accelerating of the vehicle in question in the P & G running mode.

The above-indicated learning compensation conditions are determined for preventing the learning compensation of the threshold vehicle-to-vehicle distance reference maps as a result of a releasing operation of the accelerator pedal 78 performed for a reason other than approaching of the vehicle in question to the preceding vehicle. Although the individual vehicle operators have different characteristics regarding the vehicle-to-vehicle distance Dv below which the vehicle operators operate to decelerate the vehicle in question as a result of the approaching of the vehicle in question to the preceding vehicle, for example, a difference of values of the above-indicated vehicle-to-vehicle distance Dv for the individual vehicle operators is held within a given range determined by the running speed V and the acceleration value of the vehicle, etc., and the different values of the vehicle-to-vehicle distance Dv are not considerably different from the original threshold vehicle-to-vehicle distance referenced value (initial value HSK0 or corrected value HSK1 or HSK2 obtained by the learning compensation). In this respect, the learning compensation may be inhibited where the corrected threshold vehicle-to-vehicle distance reference value is not held within a predetermined range, or is different from the original threshold vehicle-to-vehicle distance reference value by an amount larger than a predetermined upper limit. Further, it is possible to inhibit the learning compensation immediately after the accelerator pedal 78 has been released only once, but to permit the learning compensation only after the accelerator pedal 78 has been released a predetermined number of times or more to decelerate the vehicle, and on the basis of an average of the values of the vehicle-to-vehicle distance Dv at the respective releasing operations of the accelerator pedal 78. In the present embodiment, the learning compensation is implemented for the threshold vehicle-to-vehicle distance reference value, on the basis of the specific vehicle running speed V as a parameter. However, the learning compensation may be implemented for the threshold vehicle-to-vehicle distance reference value map as a whole, irrespective of the vehicle running speed V such that a whole of the threshold vehicle-to-vehicle distance reference value map is shifted to increase or decrease the threshold vehicle-to-vehicle distance reference, in view of the same tendency of the individual vehicle operators regarding the vehicle-to-vehicle distance Dv, irrespective of the vehicle running speed V.

The vehicular drive system 8 according to the present embodiment described above is provided with the pulse-driving and gliding means 118 for setting the upper limit Vhi and the lower limit Vlo of the running speed V of the vehicle according to the upper and lower vehicle speed limit maps, and on the basis of the target running speed Vt which is the running speed V at a time when the control initiating conditions have been satisfied, and running the vehicle in the P & G running mode by alternately repeating the pulse-driving run (accelerating run) and the gliding run (decelerating run) of the vehicle at the running speed V varying between the set upper and lower limits Vhi and Vlo, the control initiating conditions including the condition that the vehicle is in the steady running state. Accordingly, the pulse-driving and gliding means 118 permits the vehicle to be run in the P & G running mode, independently of the automatic cruising control, making it possible to improve the fuel economy.

The vehicular drive system 8 is further provided with the learning means 114 for compensating the upper and lower vehicle speed limit maps for reducing the range of variation of the running speed V during the subsequent running of the vehicle in the P & G running mode, when the amount of variation of the accelerator pedal operation amount Acc during the vehicle running in the P & G running mode under the control of the pulse-driving and gliding means 118 has become equal to or larger than the predetermined upper limit, that is, when the accelerator pedal operation amount Acc, has varied above the upper limit Acc1 or below the lower limit Acc2. Accordingly, the learning means 114 permits the vehicle to be run in the P & G running mode at the running speed V varying within a range specific to the vehicle operator, which is as broad as possible to the extent that the vehicle operator does not recognize a rise and a drop of the running speed V in the P & G running mode, irrespective of a difference of the characteristics of the individual vehicle operators regarding the range of variation of the running speed V, so that the fuel economy can be effectively improved.

In addition, the control initiating conditions for initiating the running of the vehicle in the P & G running mode further include the condition that the condition that the vehicle-to-vehicle distance Dv is equal to or larger than the threshold value SK. Accordingly, it is possible to prevent deterioration of the fuel economy due to an operation of the vehicle operator to accelerate the vehicle after the operation of the vehicle operator to decelerate the vehicle as a result of excessive approaching of the vehicle to the preceding vehicle during acceleration of the vehicle in the P & G running mode. In particular, the threshold vehicle-to-vehicle distance reference value HSK(V) on the basis of which the threshold value SK is determined is subjected to the learning compensation on the basis of the vehicle-to-vehicle distance Dv detected by the vehicle-to-vehicle distance sensor 92, when the vehicle operator has performed the operation to decelerate the vehicle in the P & G running mode, that is, when the an amount of releasing operation of the accelerator pedal 78 has become equal to or larger than the predetermined upper limit β. The compensated threshold vehicle-to-vehicle distance reference value HSK(V) is reflected on the control initiating conditions for initiating the subsequent vehicle running in the P & G running mode. Thus, the threshold value SK of the vehicle-to-vehicle distance can be minimized to the extent that makes it possible to avoid the operation of the vehicle operator to decelerate the vehicle when the vehicle comes excessively close to the preceding vehicle in the alternately accelerating and decelerating mode in the P & G running mode, irrespective of a difference of the characteristics of the individual vehicle operators regarding the timing at which the vehicle operator performs the operation to decelerate the vehicle as a result of reduction of the vehicle-to-vehicle distance Dv. Accordingly, the vehicle can be run in the P & G running mode as long as the vehicle-to-vehicle distance is equal to or larger than the threshold value SK specific to the vehicle operator, which is as small as possible to the extent that makes it possible to avoid the operation to decelerate the vehicle operator when the vehicle comes excessively close to the preceding vehicle in the P & G running mode, so that the fuel economy can be effectively improved.

In addition, the above-indicated threshold vehicle-to-vehicle distance reference value HSK(V) is compensated on the basis of the vehicle-to-vehicle distance Dv detected when the vehicle operator has performed an operation to decelerate the vehicle running in the P & G running mode. Unlike the compensation of the threshold vehicle-to-vehicle distance reference value HSK(V) on the basis of an operation of the vehicle operator to decelerate the vehicle in the steady running state while the vehicle is not running in the P & G running mode, the present compensation of the threshold vehicle-to-vehicle distance reference value HSK(V) is implemented by taking account of a rate of variation of the running speed of the vehicle during acceleration (pulse-driving run) of the vehicle in the P & G running mode. Thus, the threshold value SK of the vehicle-to-vehicle distance is set to more stably avoid an operation of the vehicle operator to decelerate the vehicle upon excessive approaching of the vehicle to the preceding vehicle in the P & G running mode, making it possible to more stably prevent the deterioration of the fuel economy due to deceleration and acceleration of the vehicle upon excessive approaching of the vehicle to the preceding vehicle.

It is also noted that the timing at which the vehicle operator performs an operation to decelerate the vehicle upon reduction of the vehicle-to-vehicle distance Dv varies depending upon the running environment of the vehicle such as: the running speed V of the vehicle; a difference of the running speed of the vehicle in question with respect to that of the preceding vehicle; whether the vehicle is running in the daytime or nighttime; whether the vehicle is running in a rainy weather condition; the gradient φ of the roadway; and whether the roadway surface has a low friction coefficient μ. In the present embodiment, the threshold value SK of the vehicle-to-vehicle distance is set according to the threshold vehicle-to-vehicle distance reference value HSK(V) which is compensated according to the above-indicated equation (1), according to the running environment of the vehicle, so that the threshold value SK can be adequately set so as to avoid an operation of the vehicle operator to decelerate the vehicle running in the P & G running mode, irrespective of the specific running environment of the vehicle.

Further, the vehicular drive control apparatus according to the present embodiment is configured to run the vehicle in the P & G running mode, when the steady-running-state forecasting means 116 has forecasted, on the basis of the past running data of the vehicle stored in the memory device 70 in relation to the map data, that the steady running state will continue over the predetermined running distance or more of the vehicle. Accordingly, the vehicle can be run in the P & G running mode with improved fuel economy, where there is a relatively high degree of probability that the steady running state of the vehicle will continue for a relatively long period of time or over a relatively long running distance of the vehicle.

Second Embodiment

Then, other embodiments of this invention will be described. In the following embodiments, the same reference signs as used in the preceding embodiment will be used to identify the substantially the same elements, the description of which is omitted.

Figure 11:
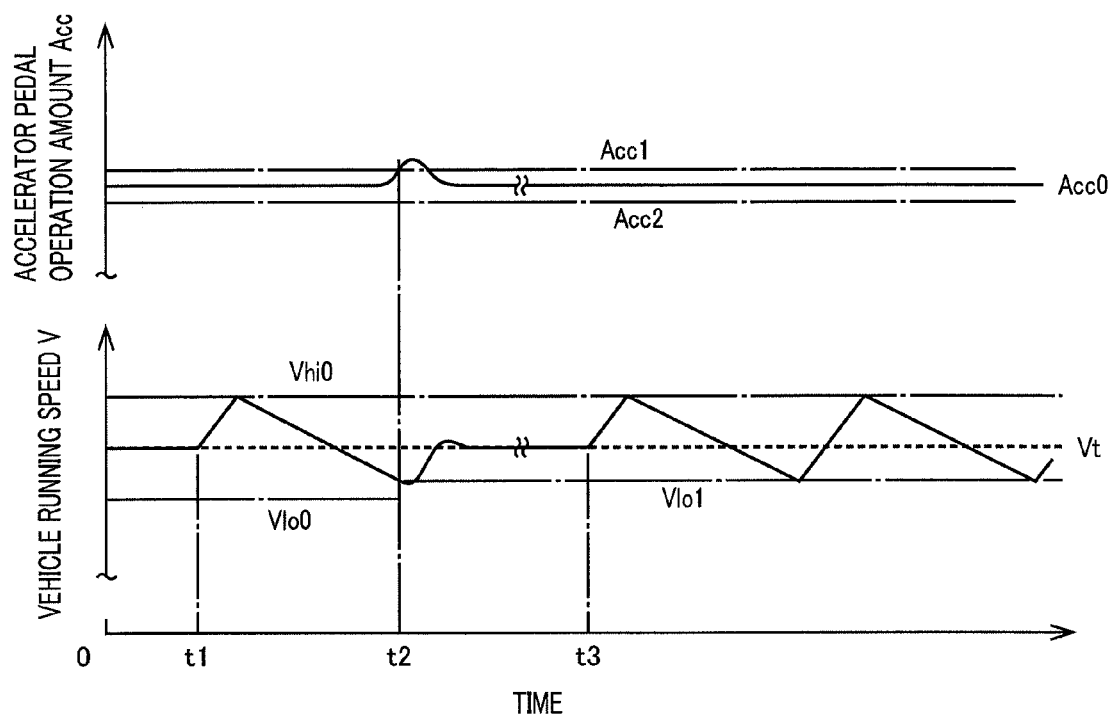
FIG. 11 is a time chart corresponding to that of FIG. 9, for explaining another embodiment of this invention wherein learning compensation of either one of the upper and lower vehicle speed limits Vhi and Vlo is implemented.

FIG. 11 is the time chart corresponding to that of FIG. 9, for explaining the embodiment arranged to implement the learning compensation of only the lower vehicle speed limit map used to set the lower vehicle speed limit Vlo, and not to implement the learning compensation of the upper vehicle speed limit map used to set the upper vehicle speed limit Vhi, when the amount of variation of the accelerator pedal operation amount Acc during the gliding run of the vehicle in the P & G running mode has exceeded the upper vehicle speed limit Acc1. This embodiment is further arranged to implement the learning compensation of only the upper vehicle speed limit map used to set the upper vehicle speed limit Vhi, and not to implement the learning compensation of the lower vehicle speed limit map used to set the lower vehicle speed limit Vlo, when the amount of variation of the accelerator pedal operation amount Acc during the pulse-driving run of the vehicle in the P & G running mode has exceeded the lower vehicle speed limit Acc2. However, the latter arrangement is not shown in FIG. 11.

The present embodiment has substantially the same advantage as the preceding embodiment, in that the vehicle can be run in the P & G running mode at the running speed V varying within a range as broad as possible to the extent that the vehicle operator does not recognize a rise and a drop of the running speed V in the P & G running mode, irrespective of the difference of the characteristics of the individual vehicle operators regarding the range of variation of the running speed V. In addition, the present embodiment is arranged to implement the learning compensation of the lower vehicle speed limit map and the upper vehicle speed limit map, independently of each other, depending upon whether the accelerator pedal operation amount Acc has been increased or decreased, so that the range of variation of the vehicle running speed V is compensated (by learning) more intricately, making it possible to permit the vehicle running speed V during the vehicle running in the P & G running mode to vary within a broader range, than in the preceding embodiment, according to the difference of characteristics of the individual vehicle operators, so that the fuel economy can be more effectively improved.

Third Embodiment

Figure 12:
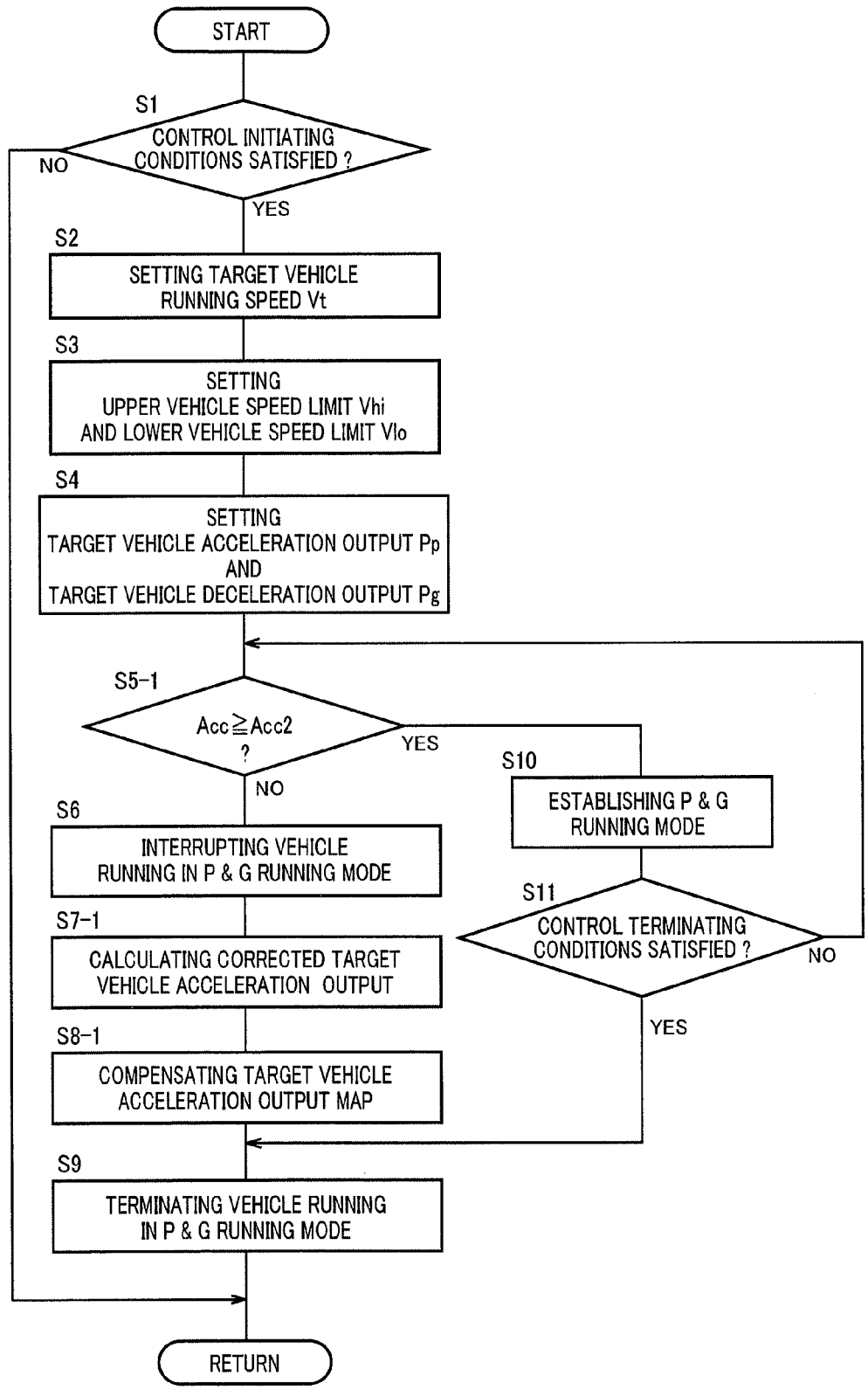
FIG. 12 is a flow chart corresponding to that of FIG. 4, for explaining a further embodiment of the invention wherein the target vehicle acceleration output map rather than the upper and lower vehicle speed limit maps is subjected to the learning compensation.
Figure 13:
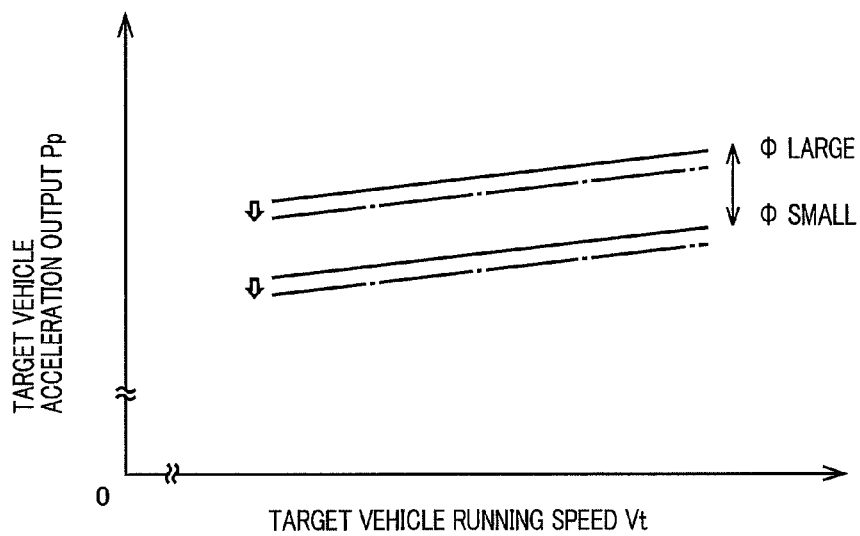
FIG. 13 is a view showing one example of the target vehicle acceleration output map corresponding to that of FIG. 7, where the learning compensation of the map is implemented according to the flow chart of FIG. 12.

FIG. 12 is the flow chart corresponding to that of FIG. 4, for explaining the embodiment which is different from the embodiment of FIG. 4, in that the steps S5, S7 and S8 in FIG. 4 are replaced by steps S5-1, S7-1 and S8-1 in FIG. 12. Namely, the preceding embodiment of FIG. 4 is arranged to reduce the range of variation of the vehicle running speed V during the vehicle running in the P & G running mode by the learning compensation, while the present embodiment is arranged to implement the learning compensation of the target vehicle acceleration output Pp during the vehicle running in the P & G running mode, so as to reduce the acceleration value of the vehicle during the pulse-driving run. Described more specifically, the step S5-1 is implemented to determine whether the accelerator pedal operation amount Acc has been become smaller than the lower limit Acc2 (Acc<Acc2) during the pulse-driving run. If the operation amount has become smaller than the lower limit Acc2 (Acc<Acc2), the above-described step S6 is followed by the step S7-1 to calculate a corrected target vehicle acceleration output (Pp−ΔPp) by subtracting a predetermined constant compensation amount ΔPp from the present target vehicle acceleration output Pp. Then, the step S8-1 is implemented to compensate the target vehicle acceleration output map stored in the above-described memory device 70, on the basis of the calculated corrected target vehicle acceleration output (Pp−ΔPp), if the predetermined learning compensation conditions are satisfied. The thus compensated target vehicle acceleration output map is subsequently used to set the target vehicle acceleration output Pp. Solid lines in FIG. 13 represent initial values of the target vehicle acceleration output map prior to the learning compensation, while one-dot chain lines represent the target vehicle acceleration output map after the learning compensation. In the present embodiment, the target vehicle acceleration output values Pp corresponding to all values of the target vehicle running speed Vt are compensated by the same constant compensation amount ΔPp. However, the target vehicle acceleration output values Pp may be compensated by different compensation amounts ΔPp depending upon parameters of the different values of the target vehicle running speed Vt. Further, the compensation amount ΔPp may be changed depending upon the amount of variation (amount of releasing) or rate of variation of the accelerator pedal operation amount Acc.

Figure 14:
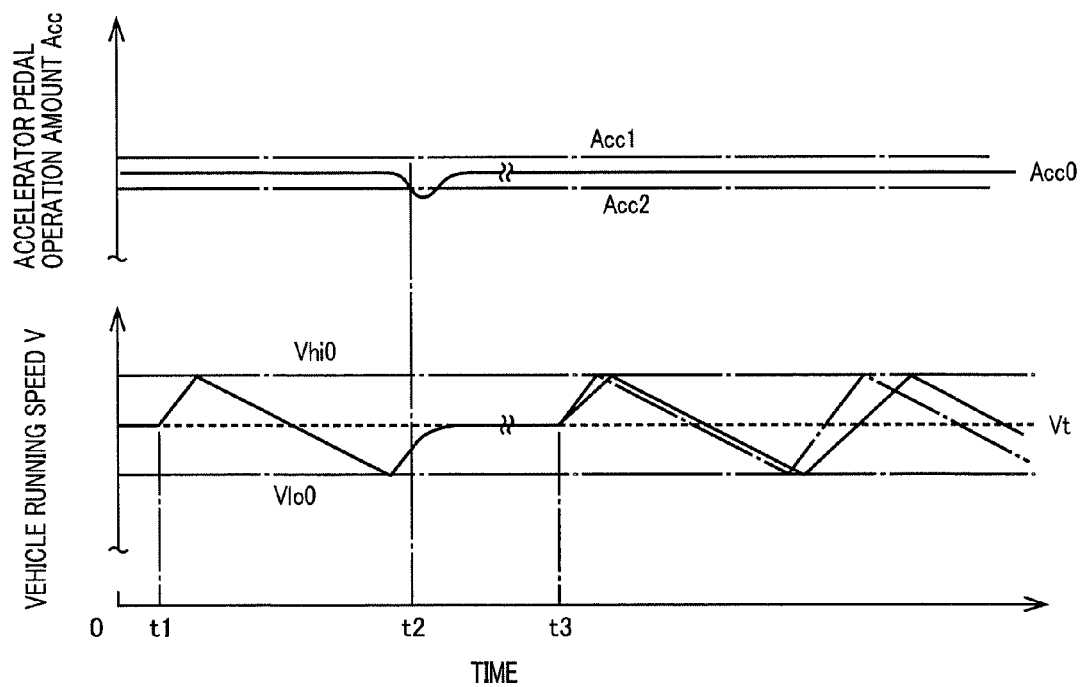
FIG. 14 is a time chart indicating examples of variation of the vehicle running speed and the operation amount of the accelerator pedal during vehicle running in the pulse-driving and gliding mode preformed according to the flow chart of FIG. 12, with learning compensation of the target vehicle acceleration output map.

FIG. 14 is the time chart corresponding to that of FIG. 9, indicating examples of variation of the accelerator pedal operation amount Acc and the vehicle running speed V during the vehicle running in the P & G running mode preformed according to the flow chart of FIG. 12, with learning compensation of the target vehicle acceleration output map. At a point of time t1, the control initiating conditions for the P & G running mode are satisfied, and the vehicle running in the P & G running mode is initiated. At a point of time t2, the vehicle operator releases the accelerator pedal 78 as a result of recognition of a variation of the vehicle running speed or a variation of the vehicle acceleration value during the pulse-driving run of the vehicle, and the accelerator pedal operation amount Acc has been reduced below the lower limit Acc2, so that the step S6 and the following steps are implemented to implement the learning compensation of the target vehicle acceleration output map, and to terminate the vehicle running in the P & G running mode. At a point of time t3, the control initiating conditions are again satisfied, and the vehicle running in the P & G running mode is initiated with the same target vehicle speed Vt. Solid lines represent the vehicle running in the P & G running mode with the target vehicle acceleration output Pp being set according to the target vehicle acceleration output map updated by the learning compensation. During this vehicle running represented by the solid lines, the rate of variation of the vehicle running speed V during the pulse-driving running (represented by the gradients of the solid lines) is made lower than during the vehicle running in the P & G running mode with the original target vehicle acceleration output Pp, which is represented by one-dot chain lines.

In the present embodiment, the vehicle can be run with the pulse-driving running of the P & G running mode at the acceleration value varying within a range specific to the vehicle operator, which is as broad as possible to the extent that the vehicle operator does not recognize a variation of the running speed V in the P & G running mode, irrespective of a difference of the characteristics of the individual vehicle operators regarding the range of variation of the running speed V (acceleration value in this embodiment), so that the fuel economy can be effectively improved.

The gliding run of the vehicle in the P & G running mode may be performed by operating the first motor/generator MG1 in the regenerative control mode or vehicle driving control mode with the engine 14 kept in its idling state, to provide a predetermined vehicle driving force or an engine braking force, or operating the second motor/generator MG2 in the regenerative control mode or vehicle driving control mode. In this case, the motor/generator MG1 or MG2 is controlled according to the target vehicle deceleration output Pg in the gliding run, which is preferably subjected to the learning compensation in the same manner as the target vehicle acceleration output Pp. Namely, if it is determined that the accelerator pedal operation amount Acc during the gliding run been increased above the upper limit Acc1, a corrected target vehicle deceleration output (Pg+ΔPg) is calculated by adding a predetermined constant compensation amount ΔPg to the present target vehicle deceleration output Pg (so as to increase the vehicle drive force, by reducing the regenerative torque, for instance). The target vehicle deceleration output map stored in the memory device 70 is updated on the basis of the calculated corrected target vehicle deceleration output (Pg+ΔPg). The thus compensated target vehicle deceleration output map is subsequently used to set the target vehicle deceleration output Pg. As a result, the rate (gradient) of variation of the vehicle running speed V during the gliding run is made lower, so that the vehicle operator is less likely to recognize the variation. In this case, too, the target vehicle deceleration output values Pg may be compensated by different compensation amounts ΔPg depending upon the different values of the target vehicle running speed Vt as parameters, and the compensation amount ΔPg may be changed depending upon the amount of variation (amount of increase) of the accelerator pedal operation amount Acc.

Fourth Embodiment

Figures 15A, 15B:
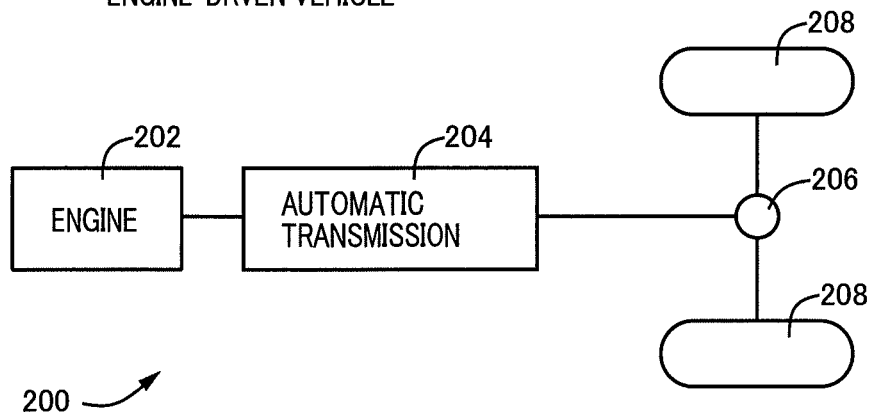
FIG. 15 are views for explaining an embodiment of the invention as applied to an engine-driven vehicle, FIG. 15(a) showing major components of a drive system of the engine-driven vehicle, while FIG. 15(b) indicting the operating states of the engine and an automatic transmission during the vehicle running in the pulse-driving and gliding mode.

FIGs. 15(a) and (b) are views for explaining the embodiment of the invention as applied to an engine-driven vehicle 200 having a step-variable automatic transmission 204 which is of a planetary gear type, for example. FIG. 15(a) is a schematic view of the engine-driven vehicle 200, which is provided with an engine 202 as a drive power source, and wherein a drive force of the engine 202 is transmitted to a differential gear device 206 through the automatic transmission 204 which has a plurality of power transmitting positions and a power cut-off neutral position, and the drive force is transmitted from the differential gear device 206 to a pair of right and left drive wheels 208. FIG. 15(b) is a view indicating the operating states of the engine 202 and the automatic transmission 204 during the vehicle running in the P & G running mode. During the pulse-driving run, the engine 202 is operated at an operating point of a comparatively high operating efficiency, while the automatic transmission 204 is placed in a selected one of the power transmitting positions, so that the vehicle is accelerated by the engine 202 operated as the drive power source. During the gliding run, the engine 202 is held in its idling state, while the automatic transmission 204 is placed in the neutral position, so that the vehicle is run in a coasting fashion. During the gliding run, the automatic transmission 204 may be placed in an appropriate one of the power transmitting positions to apply an engine brake to the vehicle, and a fuel cut control of the engine 202 may be implemented to stop the engine 202.

The present engine-driven vehicle 200 can also be run in the P & G running mode with the upper and lower vehicle speed limits Vhi and Vlo being set according to the upper and lower vehicle speed limit maps, or with the target vehicle acceleration output Pp being set according to the target vehicle acceleration output map, as in the preceding embodiments. Further, those upper and lower vehicle speed limit maps and the target vehicle acceleration output map are subjected to the learning compensation, so that the engine-driven vehicle 200 has the same advantages as in the preceding embodiments. The threshold vehicle-to-vehicle distance reference value map can also be subjected to the learning compensation, as in the preceding embodiments.

Fifth Embodiment

Figures 16A, 16B:
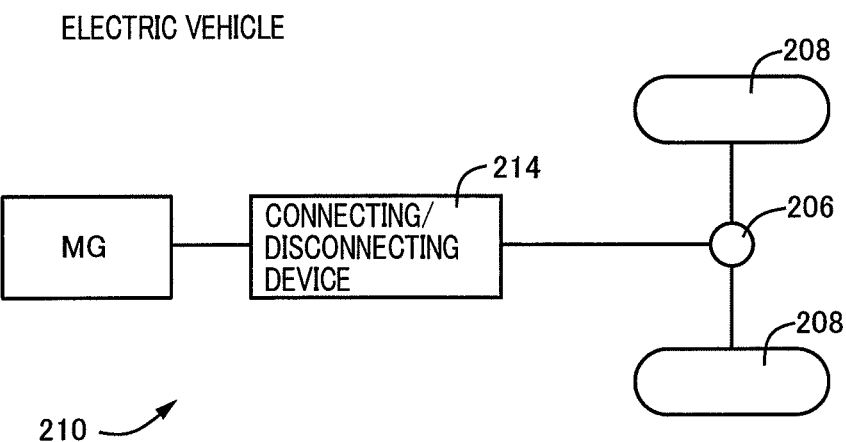
FIG. 16 are views for explaining an embodiment of the invention as applied to an electric vehicle, FIG. 16(a) showing major components of a drive system of the electric vehicle, while FIG. 16(b) indicting the operating states of a motor/generator and a connecting/disconnecting device during the vehicle running in the pulse-driving and gliding mode.

FIG. 16 are views for explaining the embodiment of the invention as applied to an electric vehicle 210 provided with a motor/generator MG as a drive power source. FIG. 16(a) is a schematic view of the electric vehicle 210 wherein a drive force of the motor/generator MG is transmitted to the differential gear device 206 through a connecting/disconnecting device 214, and the drive force is transmitted from the differential gear device 206 to the pair of right and left drive wheels 208. The connecting/disconnecting device 214, which is configured to be placed in one of a power transmitting state and a power cut-off state, may be a simple friction clutch or may be constituted by the above-described automatic transmission 204, or a synchronous meshing clutch. FIG. 16(b) is the view indicating the operating states of the motor/generator MG and the connecting/disconnecting device 214 during the vehicle running in the P & G running mode. During the pulse-driving run, the motor/generator MG is operated at an operating point of a comparatively high operating efficiency, while the connecting/disconnecting device 214 is placed in the power transmitting state, so that the vehicle is accelerated by the motor/generator MG as the drive power source. During the gliding run, the motor/generator MG is placed in its free state to zero its output torque, while the connecting/disconnecting device 214 is placed in the power cut-off state, so that the vehicle is run in a coasting fashion. During the gliding run, the connecting/disconnecting device 214 may be placed in the power transmitting state, while the motor/generator MG is operated in a regenerative control mode to provide a predetermined regenerative braking force, or in a vehicle driving control mode to decelerate the vehicle at a predetermined deceleration value.

The present electric vehicle 210 can also be run in the P & G running mode with the upper and lower vehicle speed limits Vhi and Vlo being set according to the upper and lower vehicle speed limit maps, or with the target vehicle acceleration output Pp being set according to the target vehicle acceleration output map, as in the preceding embodiments. Further, those upper and lower vehicle speed limit maps and the target vehicle acceleration output map are subjected to the learning compensation, so that the electric vehicle 210 has the same advantages as in the preceding embodiments. The threshold vehicle-to-vehicle distance reference value map can also be subjected to the learning compensation, as in the preceding embodiments.

While the embodiments of this invention have been described in detail by reference to the drawings, for illustrative purpose only, it is to be understood that the invention may be embodied with various changes and improvements, which may occur to those skilled in the art.

NOMENCLATURE OF REFERENCE SIGNS

6: Vehicle 8: Vehicular drive system 70: Memory device 80: Accelerator pedal operation amount sensor 84; Vehicle speed sensor 92: Vehicle-to-vehicle distance sensor 100: Electronic control device 112: Vehicle-running data storing means 114: Learning means 118: Pulse-driving and gliding means (Alternately accelerating and decelerating means) Acc: Operation amount of accelerator pedal V: Vehicle running speed Vhi: Upper vehicle speed limit Vlo: Lower vehicle speed limit

The invention claimed is:

1. A vehicular drive control apparatus, comprising:
alternately accelerating and decelerating means for setting upper and lower limits of a running speed of the vehicle on the basis of the running speed at a time when control initiating conditions have been satisfied, and running the vehicle in an alternately accelerating and decelerating mode by alternately repeating an accelerating run and a decelerating run of the vehicle at the running speed varying between the set upper and lower limits, said control initiating conditions including a condition that the vehicle is in a steady running state in which an amount of variation of an operation amount of an accelerator pedal is held within a predetermined range while an amount of variation of the running speed of the vehicle is held within a predetermined range; and
learning means for reducing the range of variation of the running speed or a rate of variation of the running speed during a subsequent running of the vehicle in the alternately accelerating and decelerating mode, when the amount of variation of the operation amount of said accelerator pedal during a present running of the vehicle under the control of said alternately accelerating and decelerating means has become equal to or larger than a predetermined upper limit,
and wherein an operation of said learning means is inhibited when the amount of variation of the operation amount of said accelerator pedal is equal to or larger than a predetermined learning inhibition threshold value.

2. A vehicular drive control apparatus, comprising:

a vehicle-to-vehicle distance sensor for detecting a vehicle-to-vehicle distance between the vehicle and a preceding vehicle;

alternately accelerating and decelerating means for setting upper and lower limits of a running speed of the vehicle on the basis of the running speed at a time when control initiating conditions have been satisfied, and running the vehicle in an alternately accelerating and decelerating mode by alternately repeating an accelerating run and a decelerating run of the vehicle at the running speed varying between the set upper and lower limits, said control initiating conditions including a condition that the vehicle is in a steady running state in which an amount of variation of an operation amount of an accelerator pedal is held within a predetermined range while an amount of variation of the running speed of the vehicle is held within a predetermined range, and a condition that said vehicle-to-vehicle distance is equal to or larger than a predetermined threshold value; and learning means for compensating said threshold value of the vehicle-to-vehicle distance, on the basis of the vehicle-to-vehicle distance detected by said vehicle-to-vehicle distance sensor, when an operator of the vehicle has performed an operation to decelerate the vehicle in said steady running state, so that the compensated threshold value is reflected on said control initiating conditions for initiating a subsequent running of the vehicle in the alternately accelerating and decelerating mode.

3. The vehicular drive control apparatus according to claim 2, wherein said learning means compensates said threshold value of the vehicle-to-vehicle distance on the basis of the vehicle-to-vehicle distance detected by said vehicle-to-vehicle distance sensor, when an amount of decrease of the operation amount of said accelerator pedal has become equal to or larger than a predetermined upper limit during the running of the vehicle in the alternately accelerating and decelerating mode under the control of said alternately accelerating and decelerating means.

4. The vehicular drive control apparatus according to claim 2, wherein said threshold value of the vehicle-to-vehicle distance is set according to a running environment of the vehicle.

5. The vehicular drive control apparatus according to claim 1, wherein said control initiating conditions include a condition that it is possible to forecast, on the basis of past running data of the vehicle stored in a memory device in relation to map data, that the steady running state in which the amount of variation of the operation amount of the accelerator pedal is held within the predetermined range while the amount of variation of the running speed of the vehicle is held within the predetermined range will continue over a predetermined running distance or more of the vehicle.

6. The vehicular drive control apparatus according to claim 2, wherein said control initiating conditions include a condition that it is possible to forecast, on the basis of past running data of the vehicle stored in a memory device in relation to map data, that the steady running state in which the amount of variation of the operation amount of the accelerator pedal is held within the predetermined range while the amount of variation of the running speed of the vehicle is held within the predetermined range will continue over a predetermined running distance or more of the vehicle.

* * * * *